United States Patent
Takahashi et al.

(10) Patent No.: US 8,744,244 B2
(45) Date of Patent: Jun. 3, 2014

(54) REPRODUCING APPARATUS, REPRODUCING METHOD, AND STORAGE MEDIUM

(75) Inventors: Kota Takahashi, Musashino (JP); Yasuo Masaki, Daito (JP)

(73) Assignees: The University of Electro-Communications, Chofu-shi (JP); Funai Electric Co., Ltd., Daito-shi (JP)

(*) Notice: Subject to any disclaimer, the term of this patent is extended or adjusted under 35 U.S.C. 154(b) by 1819 days.

(21) Appl. No.: 11/527,554

(22) Filed: Sep. 27, 2006

(65) Prior Publication Data

US 2007/0071413 A1 Mar. 29, 2007

(30) Foreign Application Priority Data

Sep. 28, 2005 (JP) ................. 2005-282220

(51) Int. Cl.
*H04N 5/93* (2006.01)
*H04N 5/92* (2006.01)

(52) U.S. Cl.
USPC .......................................... 386/285; 386/338

(58) Field of Classification Search
None
See application file for complete search history.

(56) References Cited

U.S. PATENT DOCUMENTS

| | | | | |
|---|---|---|---|---|
| 5,548,346 | A * | 8/1996 | Mimura et al. | 348/738 |
| 5,835,667 | A * | 11/1998 | Wactlar et al. | 386/241 |
| 7,945,142 | B2 * | 5/2011 | Finkelstein et al. | 386/285 |
| 2002/0036694 | A1 * | 3/2002 | Merril | 348/220 |
| 2004/0125124 | A1 * | 7/2004 | Kim et al. | 345/716 |
| 2006/0059426 | A1 * | 3/2006 | Ogikubo | 715/723 |

FOREIGN PATENT DOCUMENTS

| | | |
|---|---|---|
| JP | 8-179791 A | 7/1996 |
| JP | 8-292791 A | 11/1996 |
| JP | 8-317365 A | 11/1996 |
| JP | 9-90937 A | 4/1997 |
| JP | 10-133679 A | 5/1998 |
| JP | 10-191248 A | 7/1998 |
| JP | 11-109988 A | 4/1999 |
| JP | 2000-330600 A | 11/2000 |
| JP | 2001-282299 A | 10/2001 |
| JP | 2003-216200 A | 7/2003 |
| JP | 2005-33714 A | 2/2005 |

OTHER PUBLICATIONS

Japanese Office Action dated Mar. 2, 2010 including English-language translation (Four (4) pages).

* cited by examiner

*Primary Examiner* — Heather Jones
(74) *Attorney, Agent, or Firm* — Crowell & Moring LLP

(57) ABSTRACT

Disclosed is a reproducing apparatus which reproduces a sound based on audio data, including: an audio data storage unit; an analyzing unit to analyze the audio data; an imaging unit to convert the analysis result into corresponding image data; a generating unit to generate an audio image arrangement diagram in which an audio image is arranged to a relative time axis originating on a current time; and a display control unit to display the audio image arrangement diagram when a sound based on the audio data is output, wherein in the audio image arrangement diagram, an audio image output at a current time point can be recognized, and the audio image arrangement diagram includes an audio image of any one time zones of one from the current time to a past, from the current time to a future, and from a past to a future.

8 Claims, 17 Drawing Sheets

REPRODUCING APPARATUS, REPRODUCING METHOD, AND STORAGE MEDIUM

BACKGROUND OF THE INVENTION

1. Field of the Invention

The present invention relates to a reproducing apparatus, to a reproducing method, and to a storage medium.

2. Description of Related Art

Generally, in a VCR reproducing apparatus or a DVD reproducing apparatus, a fast-forward operation or a rewinding operation is performed while video displayed on a display unit or a counter of a reproducing time is being viewed. During the fast-forward operation or rewinding operation, a user needs to continuously watch the video displayed on the display unit or the counter at the time of the operation, which stresses users' eyes. For this reason, a technique has been known in which among video data stored in a DVD or the like, representative video of each scene is thumbnail-displayed (for example, JP 2005-033714A).

However, according to this technique, in the thumbnail display of the video data, since a fast-forward operation or a rewinding operation cannot be performed for every scene, it is not possible for a user to reproduce desired audio data. Accordingly, devices that visualize a variety of audio data have been known. For example, a device that displays a sound waveform and the thumbnail (for example, JP 10-191248A), a device that displays a bar graph in which the temporal variation of sound data in a meeting or the like is discriminated for every speaker (for example, JP 08-317365A), a device that analyzes audio data, and separates the temporal variation of the audio data by colors for every frequency band and displays the temporal variation by a bar graph (for example, JP 09-090937A), and a device that analyzes audio data and displays the analyzed audio data in a three-dimensional graph having a time axis, a frequency axis, and a power axis (for example, JP 08-292791A) have been known.

Further, methods of visually displaying audio data by using display other than the above-described graph display (for example, JP 08-179791A, JP 11-109988A, and JP 2000-330600A) have also been known. For example, a method of analyzing audio data, determining whether the analyzed audio data is a human voice or music, and performing icon display (for example, JP 08-179791A), and a method of performing character display on audio data by using an audio recognizing technology (for example, JP 11-109988A) have been known. Further, a method of displaying a three-dimensional diagram using an analyzed value obtained by analyzing audio data as one side on a time axis, and deforming the three-dimensional diagram to edit the audio data (for example, JP 2000-330600A) has been known.

Further, as a general method that does not depend on various types of audio, for example, research narrowed to a specific sound source, such as a voice, has been made ("Visible Speech" published by Van Nostrand in New York, in 1947). Further, attempts that visually displays audio for the people with hearing difficulties to recognize the audio have been made public ("Audio Visualization for the People with Hearing Difficulties" disclosed in the Journal of the Acoustical Society of Japan, Vol. 52, No. 12, pp. 979, 1996).

Meanwhile, in a case in which a user performs a fast-forward operation or a rewinding operation to reproduce desired audio data, the user recognizes a visually displayed location (current time point) of currently reproduced audio data in visual display of the audio data, so that the user can easily recognize a visually displayed location of desired audio data.

However, according to the technologies disclosed in JP 08-179791A, JP 11-109988A, and JP 2000-330600A, when the audio data is reproduced, visual display does not vary according to the passage of time. In the visual display, as the reproducing of the audio data progresses, the location of the current time point moves, and thus the user should read out a portion that display in which the reproduced audio data at the current time point is visualized corresponds in the visualized display. As a result, it is not possible for a user to view contents of the past or the future based on the current time point. That is, since the visualized display of the audio data according to the related art is display on the absolute time axis, the relationship between the currently reproduced audio data and the visualized audio data is not necessarily obvious. As a result, it is difficult for the user to recognize the contents of the desired audio data at the time of reproducing the audio, and thus it is not possible to sufficiently support the reproducing operation of the audio data.

In this case, the supporting of the reproducing operation of the audio data means supporting performed such that during the fast-forward operation or the rewinding operation, one-touch operation can be made without the user monitoring the contents of the audio data every moment during the operation, supporting performed such that the fast-forward completing time point or the rewinding completing time point can be forecasted in advance so as to prevent the fast-forward operation or the rewinding operation from being excessively performed, or providing information to the user such that the user can recognize contents to the extent of determining the new reproducing time point without the contents, which do non need to be recognized in advance by the user, such as an end of a drama, being exposed to the user, in an operation that reproduces the audio data from the new time point.

Further, according to the methods disclosed in "Visible Speech" published by Van Nostrand in New York, in 1947, and "Audio Visualization for the People with Hearing Difficulties" disclosed in the Journal of the Acoustical Society of Japan, Vol. 52, No. 12, pp. 979, 1996, the audio data is limited to the voice data, and the audio data including the voice, the music, a natural sound, or the like cannot be visualized.

SUMMARY OF THE INVENTION

Accordingly, it is an object of the present invention to provide a reproducing apparatus and a reproducing method, in which continuous audio data is visualized with image data, the image data is displayed on the time axis based on the current time point, and a user can easily recognize contents of the audio data, and a storage medium that stores visualized image data for the user to easily recognize the contents of the continuous audio data, such that a reproducing operation of the audio data by the user is supported.

According to a first aspect of the invention, a reproducing apparatus which reproduces a sound based on accumulated audio data or audio data sequentially input from outside and outputs the sound from an audio output unit, comprises: an audio data storage unit to store audio data; an analyzing unit to analyze the audio data stored in the audio data storage unit in accordance with a predetermined analysis condition; an imaging unit to convert an analysis result obtained by the analyzing unit into previously set image data corresponding to the analysis result; a generating unit to generate an audio image arrangement diagram in which an audio image based on the image data imaged by the imaging unit is arranged to correspond to a relative time axis originating on a current time point; and a display control unit to display the audio image arrangement diagram generated by the generating unit on a display unit when a sound based on the audio data is output from the audio output unit, wherein in the audio image arrangement diagram, an audio image corresponding to a sound output from the audio output unit at a current time point can be recognized, and the audio image arrangement diagram includes an audio image of any one of three time zones which are a time zone ranging from the current time point to a past including the current time point, a time zone ranging from the current time point to a future including the current time point, and a time zone ranging from a past to a future including the current time point.

By doing so, the analyzing unit analyzes the audio data stored in the audio data storage unit by a predetermined analysis condition, the imaging unit converts an analysis result obtained by the analyzing unit into image data set in advance to correspond to the analysis result, the generating unit generates an audio image arrangement diagram in which an audio image based on the image data imaged by the imaging unit is arranged so as to correspond to a relative time axis based on a current time point, and the display control unit displays the synthesized image generated by the synthesizing unit on a display unit, when the audio based on the audio data is output from the audio output unit. In the audio image arrangement diagram, an audio image corresponding to audio output from the audio output unit at a current time point can be recognized, the audio image arrangement diagram includes an audio image of any one of three time zones that include one time zone from the current time point to the past, another time zone from the current time to the future, and the other time zone from the past including the current time to the future. Therefore, the association between the audio output from the audio output unit at the current time point and the visualized audio image becomes obvious. As a result, the user can easily recognize the contents of the continuous audio data by the corresponding audio image arrangement diagram.

Further, the audio image arrangement diagram has the temporal continuity, as compared with the thumbnail display of the image, and thus the user can intermittently understand an entire aspect. Therefore, it is possible to immediately provide the information to the user.

Preferably, the reproducing apparatus further comprises: a video data storage unit to store video data in relation to the audio data; and a synthesizing unit to synthesize the audio image arrangement diagram generated by the generating unit and a video based on the video data stored in the video data storage unit, so as to generate a synthesized image, wherein the display control unit displays the synthesized image generated by the synthesizing unit on a display unit when a sound based on the audio data is output from the audio output unit.

By doing so, the video data storage unit associates video data with the audio data and stores the video data, the synthesizing unit that synthesizes the audio image arrangement diagram generated by the generating unit and the video based on the video data stored in the video data storage unit so as to generate the synthesized image, and the display control unit displays the synthesized image generated by the synthesizing unit on a display unit, when the audio based on the audio data is output from the audio output unit. The user can view the video and the audio image arrangement diagram, and can easily recognize the contents of the continuous audio data by the corresponding audio image arrangement diagram.

Preferably, the generating unit synthesizes an index indicating the current time point to the audio image arrangement diagram.

By doing so, the generating unit synthesizes an index indicating the current time point to the audio image arrangement diagram. Therefore, the user can easily recognize the current time point by using the index displayed in the audio image arrangement diagram, and can recognize the contents of the audio data from the audio image arrangement diagram.

Preferably, the generating unit changes a scale of the time axis of the audio image arrangement diagram according to a reproduction speed of the audio data.

By doing so, the generating unit changes a scale of the time axis of the audio image arrangement diagram according to a reproduction speed of the audio data. Therefore, the speed at which the audio image moves along the time axis in the audio image arrangement diagram becomes constant without depending on the reproduction speed of the audio image, and the proper audio image arrangement diagram according to the reproduction speed of the audio data can be displayed on the display unit. As a result, the user can easily recognize the contents of the audio data from the audio image arrangement diagram.

Preferably, the generating unit generates at least two audio image arrangement diagrams whose time axes are different in scale from each other, and the display control unit simultaneously displays on the display unit the at least two audio image arrangement diagrams which are generated by the generating unit and whose time axes are different in scale from each other.

By doing so, the generating unit generates at least two audio image arrangement diagrams in which scales of the time axes are different from each other, and the display control unit simultaneously displays on the display unit at least two audio image arrangement diagrams which are generated by the generating unit and in which the scales of the time axes are different from each other. Therefore, the user can select the desired audio image arrangement diagram from two or more of the audio image arrangement diagrams in which the scales of the time axes are different from each other, if necessary, and can easily recognize the contents of the audio data from the selected audio image arrangement diagram.

Preferably, the generating unit generates the audio image arrangement diagram in which a lateral axis is the time axis and a scale of the time axis varies in a longitudinal axis direction, and the display control unit displays on the display unit the audio image arrangement diagram which is generated by the generating unit and in which the scale of the time axis varies in the longitudinal axis direction.

By doing so, the generating unit generates the audio image arrangement diagram in which a horizontal axis is the time axis and a scale of the time axis varies in a longitudinal direction, and the display control unit displays on the display the audio image arrangement diagram which is generated by the generating unit and in which the scale of the time axis varies in the longitudinal direction. Therefore, the user can recognize from one audio image arrangement diagram the plurality of audio image arrangement diagrams A1 in which the scales of the time axes are different from one another, and can reduce the stress applied to the eyes when viewing the plurality of independently divided audio image arrangement diagrams in which the scales of the time axes are different from one another.

Preferably, the generating unit generates an audio image arrangement diagram in which a scale of the time axis is reduced toward a second time zone from a first time zone, the second time zone being farther from a current time point than the first time zone.

By doing so, the generating unit generates an audio image arrangement diagram in which a scale of the time axis is reduced toward a second time zone farther from a current time point than a first time zone from the first time zone. Therefore, the user can specifically recognize the contents of the audio data within the time zone (first time zone) near the current time point, and can recognize the contents of the audio data within the second time zone farther than the current time point.

Preferably, the reproducing apparatus further comprises: an operation unit to output an operation signal in accordance with operation of a user, wherein the generating unit synthesizes a marker indicating a reproducing start time point to the audio image arrangement diagram, and the reproducing apparatus further comprises a reproducing control unit to start reproducing audio data from a reproducing start time point shown by the marker based on an operation signal selecting the marker output from the operation unit.

By doing so, the reproducing apparatus further includes an operation unit that outputs an operation signal by operation of a user. The generating unit synthesizes a marker indicating a reproducing start time point to the audio image arrangement diagram, and the reproducing control unit starts reproducing audio data from a reproducing start time point shown in the marker based on an operation signal selecting the marker output from the operation unit. Therefore, the user can easily reproduce the audio data within the desired time by only selecting the marker in the audio image arrangement diagram.

The reproducing apparatus further comprises; a representative video data extracting unit to extract representative video data at a predetermined time point from the video data storage unit, wherein the synthesizing unit synthesizes the audio image arrangement diagram generated by the generating unit, a video based on the video data stored in the video data storage unit, and an image based on the representative video data extracted by the representative video data extracting unit so as to correspond to the relative time axis originating on the current time point.

By doing so, the representative video data extracting unit extracts representative video data at a predetermined time point from the video data storage unit, and the synthesizing unit associates the video based on the audio image arrangement diagram generated by the generating unit and the video data stored in the video data storage unit and the image based on the representative video data extracted by the representative video data extracting unit with the relative time axis based on the current time point to synthesize the video and the image. Therefore, the image based on the representative video data is displayed on the audio image arrangement diagram. As a result, the user can easily recognize the location in the audio image arrangement diagram of the desired audio data by the image based on the representative video data displayed in the audio image arrangement diagram, and can easily reproduce the audio data within the predetermined time.

According to a second aspect of the invention, a storage medium to store audio data stores as metadata an audio image arrangement diagram data in which an analysis result obtained by analyzing audio data in accordance with a predetermined analysis condition is converted into image data and the image data is arranged so as to correspond to a relative time axis based on a current time point.

By doing so, since the storage medium stores an audio image arrangement diagram as a parameter, even though the special units (for example, the analyzing unit, the imaging unit, the generating unit, and the like) are not provided in the reproducing apparatus, the audio image arrangement diagram can be displayed on the display unit by reproducing the audio image arrangement diagram data stored in the storage medium.

According to a third aspect of the invention, a method of reproducing audio data in the reproducing apparatus of the first aspect, comprises the steps of: analyzing audio data stored in the audio data storage unit in accordance with a predetermined analysis condition; imaging an analysis result obtained by the analyzing by converting the analysis result into previously set image data corresponding to the analysis result; generating an audio image arrangement diagram in which an audio image based on the image data obtained by the imaging is arranged so as to correspond to a relative time axis based on a current time point; and displaying the audio image arrangement diagram generated in the generating on a display unit when a sound based on the audio data is output from the audio output unit, wherein in the audio image arrangement diagram, an audio image corresponding to a sound output from the audio output unit at a current time point is recognizable, and the audio image arrangement diagram includes an audio image of any one of three time zones which are a time zone ranging from the current time point to a past including the current time point, a time zone ranging from the current time point to a future including the current time point, and a time zone ranging from a past to a future including the current time point.

By doing so, the analyzing unit analyzes the audio data stored in the audio data storage unit by a predetermined analysis condition in the analyzing, the imaging unit converts the analysis result obtained in the analyzing into image data set in advance so as to correspond to the analysis result in the imaging, the generating unit generates an audio image arrangement diagram in which an audio image on basis of the image data imaged by the imaging is arranged so as to correspond to a relative time axis based on a current time point in the generating, and the display control unit displays the audio arrangement diagram generated by the generating on a display unit, when the audio based on the audio data is output from the audio output unit in the displaying. In the audio image arrangement diagram, an audio image corresponding to audio output from the audio output unit at a current time point can be recognized, and the audio image arrangement diagram includes an audio image of any one of three time zones that include one time zone from the current time point to the past, another time zone from the current time to the future, and the other time zone from the past including the current time to the future. Therefore, the association between the audio output from the audio output unit at the current time point and the visualized audio image becomes obvious. As a result, the user can easily recognize the contents of the continuous audio data by the corresponding audio image arrangement diagram.

Further, the audio image arrangement diagram has the temporal continuity, as compared with the thumbnail display of the image, and thus the user can intermittently understand an entire aspect. Therefore, it is possible to immediately provide the information to the user.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF PREFERRED EMBODIMENTS

Hereinafter, a reproducing apparatus, a reproducing method, and a storage medium according to the preferred embodiments of the invention will be described in detail with reference to the accompanying drawings.

First Embodiment

As a reproducing apparatus according to a first embodiment of the invention, an audio data reproducing apparatus 100 is exemplified.

Figure 1:
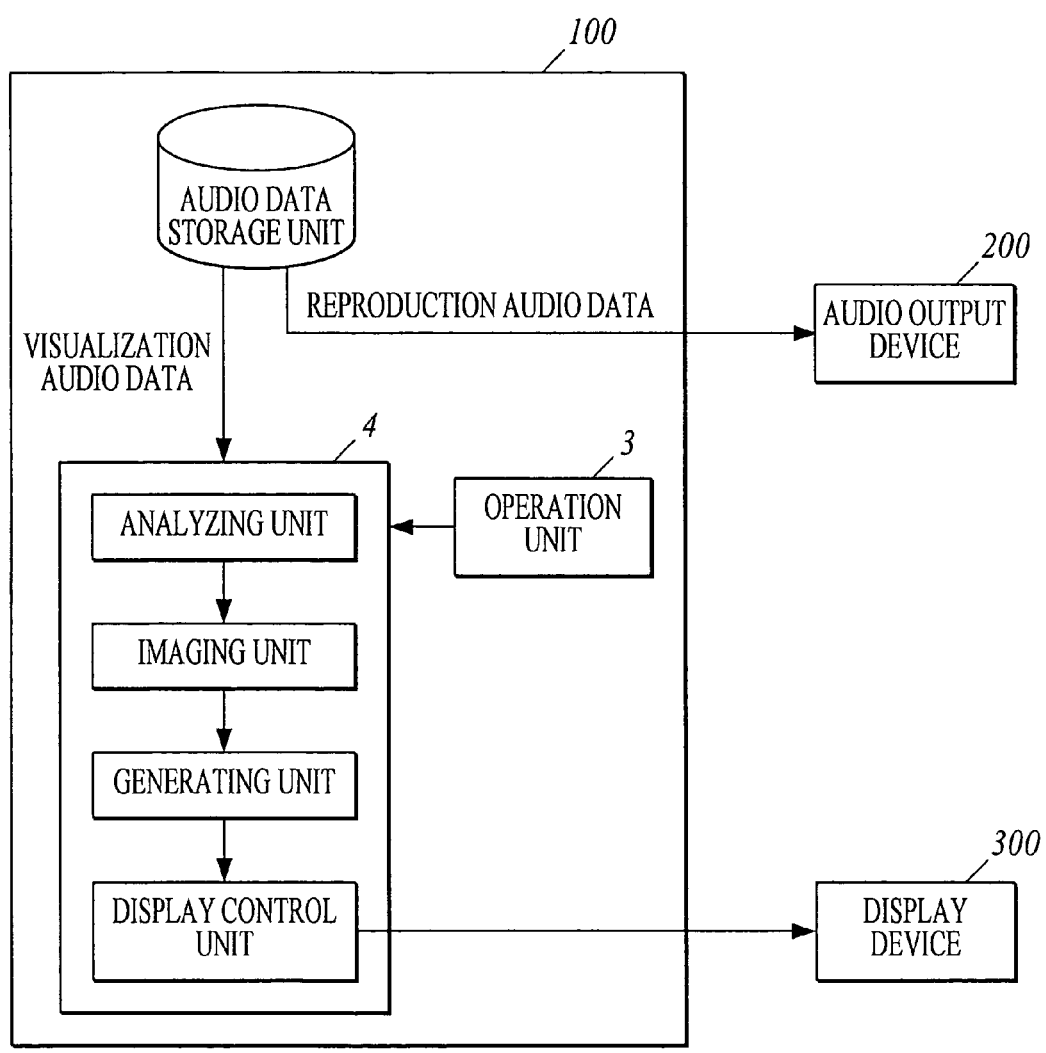
FIG. 1 is a diagram illustrating a structure of an audio reproducing apparatus according to a first embodiment of the invention.

First, a structure of an audio data reproducing apparatus 100 according to a first embodiment of the invention will be described with reference to FIG. 1. The audio data reproducing apparatus 100 includes, for example, an audio data storage unit that stores audio data. The audio data reproducing apparatus 100 further includes a control unit 4 and an operation unit 3. The control unit 4 includes an analyzing unit that analyzes audio data stored in an audio data storage unit, an imaging unit that converts an analysis result obtained by the analyzing unit into image data, a generating unit that generates an audio image arrangement diagram A1 in which an audio image B based on the image data imaged by the imaging unit is arranged so as to correspond to a relative time axis based on a time point (current time point) when audio based on audio data is output from an audio output device 200 serving as an audio output unit, and a display control unit that displays the audio image arrangement diagram A1 generated by the generating unit on a display device 300 serving as a display unit.

Figure 2:
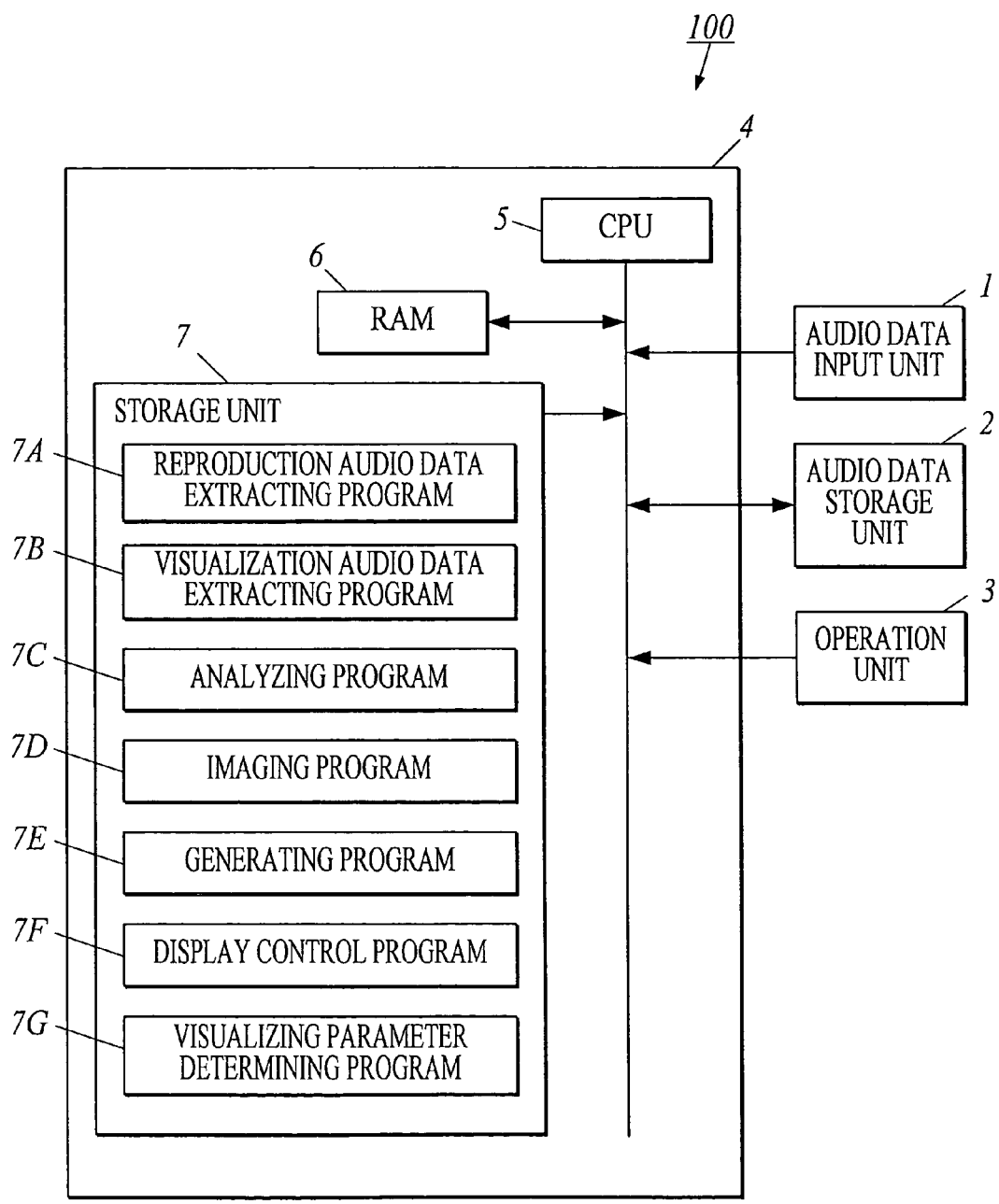
FIG. 2 is a diagram illustrating a structure of an inner structure of an audio reproducing apparatus according to a first embodiment of the invention.

Next, a specific structure of the audio data reproducing apparatus 100 according to the first embodiment of the invention will be described with reference to FIG. 2. As shown in FIG. 2, the audio data reproducing apparatus 100 includes, for example, an audio data input unit 1, an audio data storage unit 2 that stores audio data, an operation unit 3, and a control unit 4. The audio data reproducing apparatus 100 performs a reproducing process, such as a decoding process, on audio data accumulated in a CD, a DVD, or the like, or audio data, such as radio broadcasting, sequentially input from outside, and outputs the data to an audio output device 200 having a speaker or the like.

The audio data input unit 1 includes, for example, a tuner or the like. The audio data input unit 1 receives a broadcasting wave, such as radio broadcasting or the like, and outputs audio data included in the broadcasting wave to the audio data storage unit 2.

Examples of the audio data storage unit 2 may include a CD, a DVD, an HDD, a semiconductor memory, a memory card, and the like, and the audio data storage unit 2 stores temporally continuous audio data. Specifically, the audio data storage unit 2 stores temporally continuous audio data accumulated in the CD, the DVD, or the like, or audio data sequentially input by the audio data input unit 1.

The operation unit 3 includes operation buttons (not shown) that are pressed by a user and output various operation signals. The operation unit 3 may be provided in the audio data reproducing apparatus 100 or included as a remote controller.

As shown in FIG. 2, the control unit 4 may include, for example, a CPU 5 (Central Processing Unit), a RAM 6 (Random Access Memory), a storage unit 7, or the like.

The CPU 5 reads out process programs stored in the storage unit 7 or the like, and develops them on the RAM 6 so as to execute them. In this way, the CPU 5 performs overall control of the audio data reproducing apparatus 100.

The RAM 6 develops the process programs or the like executed by the CPU 5 in a program storage region of the RAM 6, and stores the input data, or the process result generated when the process programs are executed.

The storage unit 7 has a recording medium (not shown) in which programs or data is stored in advance, and the recording medium is composed of, for example, a semiconductor memory or the like. Further, the storage unit 7 stores various data and various programs that allow the CPU 5 to perform a function of controlling the whole audio data reproducing apparatus 100, and data processed by executing the programs. Specifically, as shown in FIG. 2, the storage unit 7 stores, for example, a reproduction audio data extracting program 7A, a visualization audio data extracting program 7B, an analyzing program 7C, an imaging program 7D, a generating program 7E, a display control program 7F, a visualizing parameter determining program 7G, or the like.

The reproduction audio data extracting program 7A is a program that allows the CPU 5 to perform a function of retrieving the audio data storage unit 2 based on an operation signal input by the operation unit 3 so as to extract reproduction audio data.

The visualization audio data extracting program 7B is a program that allows the CPU 5 to perform a function of retrieving the audio data storage unit 2 based on an operation signal input by the operation unit 3 so as to extract audio data within a prerequisite time necessary for the CPU 5 to generate an audio image B to be described later. Here, the predetermined time refers to a time ranging from a time point (current time point) of the audio data extracted and reproduced by executing the reproduction audio data extracting program 7A by the CPU 5 to a time point (future time point) later than the current time point. Further, the predetermined time may be determined based on the operation signal input by the operation unit 3, or determined according to a reproduction speed of audio based on the audio data. Furthermore, the predetermined time can be varied by executing the visualizing parameter determining program 7 to be described later by means of the CPU 5.

The analyzing program 7C is a program that allows the CPU 5 to perform a function of analyzing the audio data extracted by executing the visualization audio data extracting program 7B by a predetermined analyzing condition. As specific analysis conditions, for example, short-time Fourier transform (FFT), cepstrum analysis, temporal frequency plane representation by Wigner distribution, presumption of a polarity location fitted to an AR model, and the like may be exemplified. Further, as analysis conditions, even though theoretical grounding, such as theoretical optimality, does not exist, an experimental condition that corresponds to immediate perpetuation of a human may be used. The CPU 5 executes the analysis program 7C so as to function as an analyzing unit.

The imaging program 7D is a program that allows the CPU 5 to perform a function of executing the analysis program 7C and converting the result obtained by analyzing the audio data into image data set in advance to correspond to the analyzed result. Specifically, the imaging program 7D is a program that allows the CPU 5 to perform a function of converting the analyzed result into a RGB value corresponding to a parameter value obtained by the analysis and the number of pixels (size of an image) so as to reduce the size of the image as a pixel group having a color represented by a RGB value, and converting it into image data of an audio image B. The CPU 5 executes the imaging program 7D so as to function as an imaging unit.

The generating program 7E is a program that allows the CPU 5 to perform a function of executing the imaging program 7D to generate an audio image arrangement diagram A1 in which the audio image B based on the image data obtained by imaging the analyzed result is arranged so as to correspond to a relative time axis based on the current time point. Further, the generating program 7E is a program that allows the CPU 5 to perform a function of synthesizing an index S indicating a location (current time point) in the audio image arrangement diagram A1 of the audio image B of the currently reproduced audio data among temporally continuous audio data to the audio image arrangement diagram A1. The CPU 5 executes the generating program 7E so as to function as the generating unit.

The display control program 7F is a program that allows the CPU 5 to perform a function of displaying the audio image arrangement diagram A1 generated by executing the generating program 7E on the display device 300 including a liquid crystal panel. The CPU 5 executes the display control program 7F so as to function as a display control unit.

The visualizing parameter determining program 7G is a program that allows the CPU 5 to execute a function of adjusting various parameter values used in a process for executing the analyzing program 7C or the imaging program 7D.

In addition, in a case in which the CPU 5 executes the visualizing parameter determining program 7G and thus an optimal point in a trade-off relationship between a temporal resolution and a frequency resolution of the short-time Fourier transform (FFT) varies according to the reproduction speed of the audio based on the audio data, the CPU 5 performs an adjustment process for optimizing an FFT point according the variation.

Further, in a case in which the CPU 5 executes the visualizing parameter determining program 7G, and an operation signal for emphasizing the difference between audio images B generated from the analyzed result of the audio data according to types of the audio data (for example, voice, music, man's voice, woman's voice, or the like) by a user is input by the operation unit 3, the CPU 5 adjusts various parameter values used in a process for executing the analysis program 7C or an imaging program 7D based on the operation signal.

Figure 3:
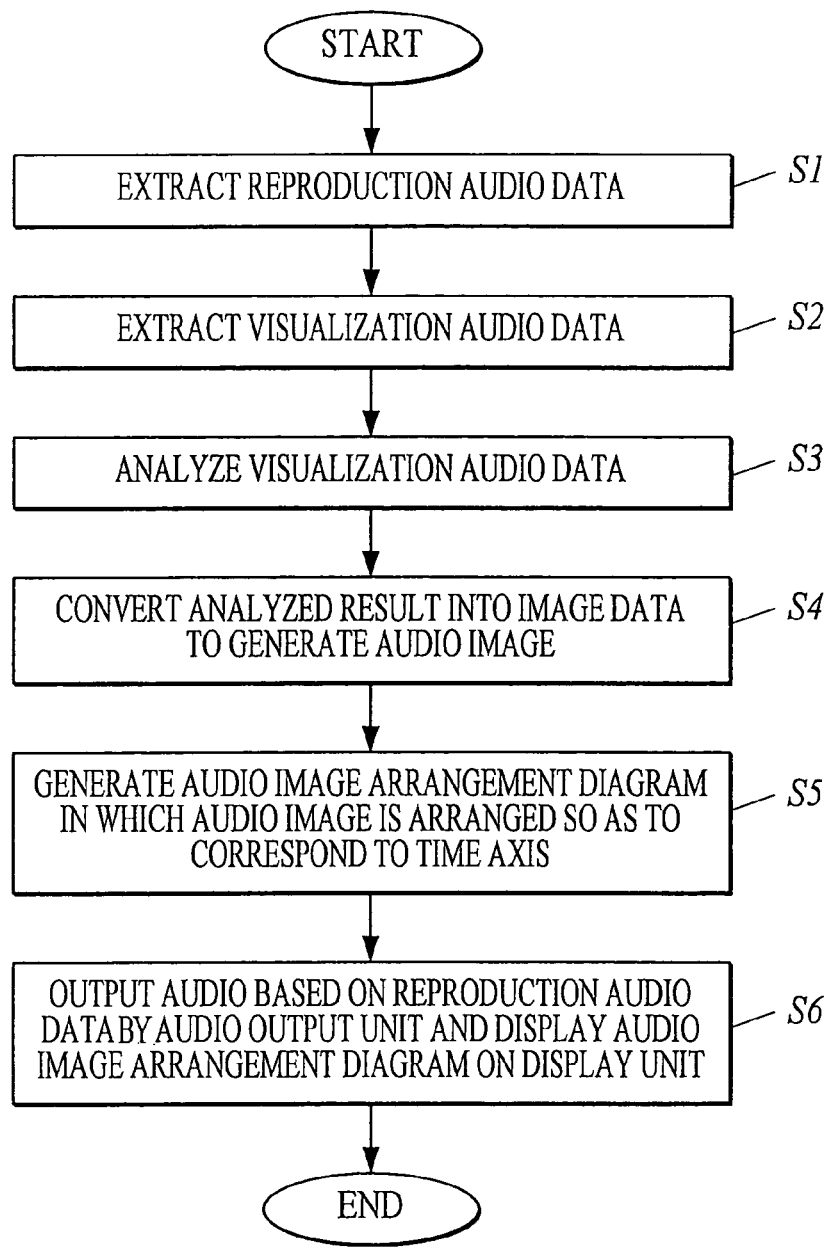
FIG. 3 is a diagram illustrating an operation of an audio reproducing apparatus according to a first embodiment of the invention.

Next, a visualizing operation (reproducing operation) of the audio data in the audio data reproducing apparatus 100 that has the above-described structure will be described with reference to the flowchart illustrated in FIG. 3.

First, the CPU 5 executes the reproduction audio data extracting program 7A, retrieves the audio data storage unit 2 based on the operation signal input by the operation unit 3, and extracts the reproduction audio data (step S1).

The CPU 5 executes the visualization audio data extracting program 7B, retrieves the audio data storage unit 2 based on the operation signal input by the operation unit 3, and extracts the audio data within a prerequisite time necessary for generating the audio image B, for example, the audio data within the predetermined time ranging from a time point (current time point) of the reproduced audio data to the time point (future time point) later than the current time point (step S2).

Figure 4A:
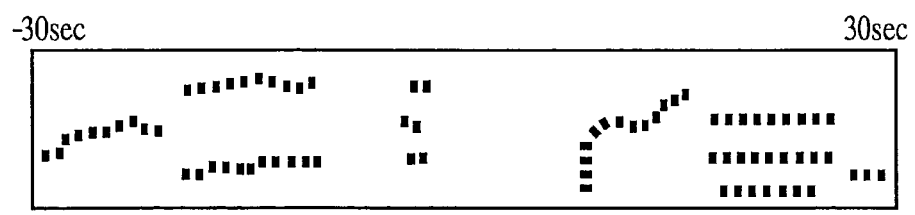
FIG. 4A is a diagram illustrating an example of the result by analyzing audio data by an audio reproducing apparatus according to a first embodiment of the invention.

The CPU 5 executes the analysis program 7C to analyze the audio data extracted in step S2 (step S3: analysis process). FIG. 4A shows an example of the analyzed result obtained by analyzing the audio data in step S3.

The analyzed result shown in FIG. 4A is the result obtained by subjecting the audio data to cepstrum analysis. In FIG. 4A, a longitudinal axis indicates a fundamental frequency obtained by the cepstrum analysis, and a horizontal axis indicates a time.

The CPU 5 executes the imaging program 7D, and converts the result obtained by analyzing the audio data in step S3 into image data set in advance to correspond to the analysis result (step S4: imaging process).

The CPU 5 executes the generating program 7E, generates the audio image arrangement diagram A1 in which the audio image B based on the image data obtained by imaging the analyzed result in step S4 is arranged so as to correspond to the relative time axis based on the current time, and synthesizes an index S indicating the location (current time point) in the audio image arrangement diagram A1 of the audio image B of the currently reproduced audio data to the audio image arrangement diagram A1 (step S5: generating process).

The CPU 5 outputs the audio based on the reproduction audio data extracted in step S1 to the audio output device 200, and executes the display control program 7F to display the audio image arrangement diagram A1 generated in step S5 on the display device 300 (step S6: display process).

Figure 4B:
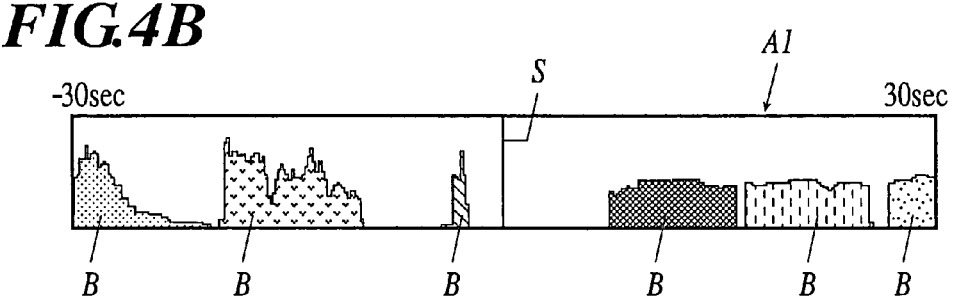
FIGS. 4B, 4C, and 4D are diagrams illustrating an example of an audio image arrangement diagram according to a first embodiment of the invention.
Figure 4C:
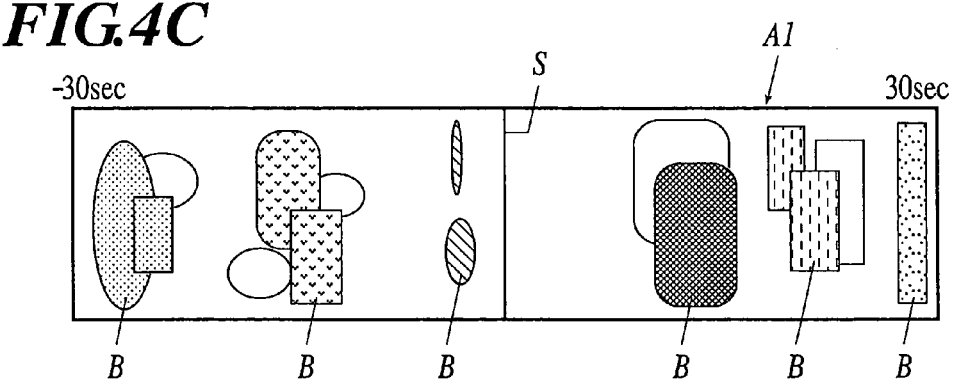

In step S6, an example of the audio image arrangement diagram A1 that is displayed on the display device 300 is shown in FIGS. 4B and 4C.

Figure 4D:
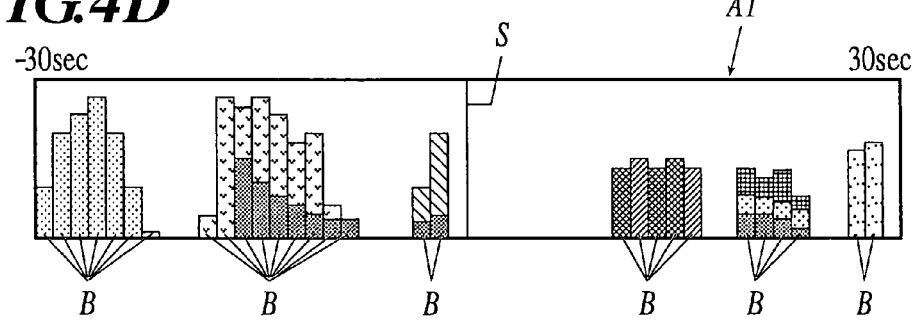

In the audio image arrangement diagram A1 show in FIG. 4B, a longitudinal axis indicates the intensity of the audio, and a horizontal axis becomes a relative time axis based on the current time point indicating the passage of time. The color of each audio image B is defined by a numerical value of a fundamental frequency in the analyzed result shown in FIG. 4A. Further, the color of the audio image B may be defined by the tone color (a constituent ratio of an overtone component obtained by FFT analysis). Further, in the audio image arrangement diagram A1 shown in FIG. 4C, for example, a horizontal axis becomes a relative time axis based on the current time point indicating the passage of time, and the intensity and the tone color of the audio are represented by a size and a shape of each audio image B arranged along the time axis, and the fundamental frequency in the analyzed result shown in FIG. 4A is represented by the color of each audio image B. Furthermore, in the audio image arrangement diagram A1 shown in FIG. 4D, for example, a horizontal axis becomes a relative time axis based on the current time point indicating the passage of time, and a horizontal width of each audio image B arranged along the time axis is constant. The horizontal width of each audio image B is made to be constant, and thus a process in step S5 can be simply performed without performing unnecessary work. Further, the color (RGB value) of each audio image B in which the horizontal width is constant is defined by the fundamental frequency of the audio and the tone color. Specifically, in the analysis of FIG. 4A, when a plurality of different frequencies of basic frequencies (hereinafter, referred to as pitches) or tone colors are detected in the same time zone, each pitch or tone color is separated by colors to be represented in one audio image B, and the intensity of the tone color or the pitch is represented by the length occupied in the audio image B in the longitudinal direction. In FIG. 4D, when the intensity of the audio is not represented, the length of the audio image B in the longitudinal direction may be constant.

In addition, the user can recognize the intensity of the audio data, the tone, and the fundamental frequency by the size, the shape, and the color of the audio image B, from the audio image arrangement diagrams A1 shown in FIGS. 4B, 4C, and 4D, so that the user can recognize the contents of the audio data from the audio image B.

In FIGS. 4B, 4C, and 4D, an index S that indicates a location (current time point) of the audio image B of the currently reproduced audio data in the audio image arrangement diagram A1 is displayed.

According to the audio data reproducing apparatus 100 and the method of reproducing the audio data according to the first embodiment having the above-described structure, the CPU 5 executes the analysis program 7C, so that the audio data stored in the audio data storage unit 2 is analyzed by a predetermined analysis condition. The CPU 5 executes the imaging program 7D, so that the analyzed result is converted into the image data set in advance to correspond to the analyzed result. The CPU 5 executes the generating program 7E, thereby generating the audio image arrangement diagram A1 in which the audio image B based on the imaged data is arranged so as to correspond to the relative time axis based on the current time point. When the audio based on the audio data is output by the audio output device 200, the CPU 5 executes the display control program 7F, so that the generated audio image arrangement diagram A1 is displayed on the display device 300. In the audio image arrangement diagram A1, the audio image B that corresponds to the audio output by the audio output device 200 at the current time point can be recognized. In addition, since the audio image arrangement diagram A1 includes an audio image B in a time zone ranging from the past including the current time point to the future, the association between the audio output by the audio output device 200 at the current time point and the visualized audio image becomes obvious. Therefore, the user can easily recognize the contents of continuous audio data by using the audio image arrangement diagram A1.

Further, since the audio image arrangement diagram A1 has more temporal continuity than the thumbnail display of the image, the entire aspect can be easily understood at every moment. Therefore, the information can be immediately given to the user.

Further, according to the audio data reproducing apparatus 100 according to the first embodiment of the invention, the CUP 5 executes the generating program 7E, so that the index S indicating the current time point is synthesized to the audio image arrangement diagram A1. Therefore, the user can easily confirm the current time point by the index S displayed in the audio image arrangement diagram A1, and easily recognize the contents of the audio data from the audio image arrangement diagram A1.

Further, as the visualization audio data, the audio data within a predetermined time ranging from a time point (current time point) of the audio data extracted and reproduced by executing the reproduction audio data extracting program 7A by means of the CPU 5 to a time point (future time point) later than the current time point has been extracted, but the invention is not limited thereto. That is, the audio data within a predetermined time ranging from a time point (past time point) earlier than the current time point to the current time point may be extracted, and the audio data within the predetermined time ranging from the time point (past time point) earlier than the current time point to the time point (future) later than the current time point may be extracted.

Further, in a case in which the audio data within the predetermined time ranging from the current time point to the time point (the future) later than the current time point is extracted as the visualization audio data, the extracted reproduction audio data may be temporarily stored in the audio data storing unit 2 and delayed by the time necessary when the visualization audio data is subjected to the visualizing process, and the audio based on the reproduction audio data may be output to the audio output device 200.

Second Embodiment

As a reproducing apparatus according to a second embodiment of the invention, an audio and video data reproducing apparatus 400 is exemplified.

Figure 5:
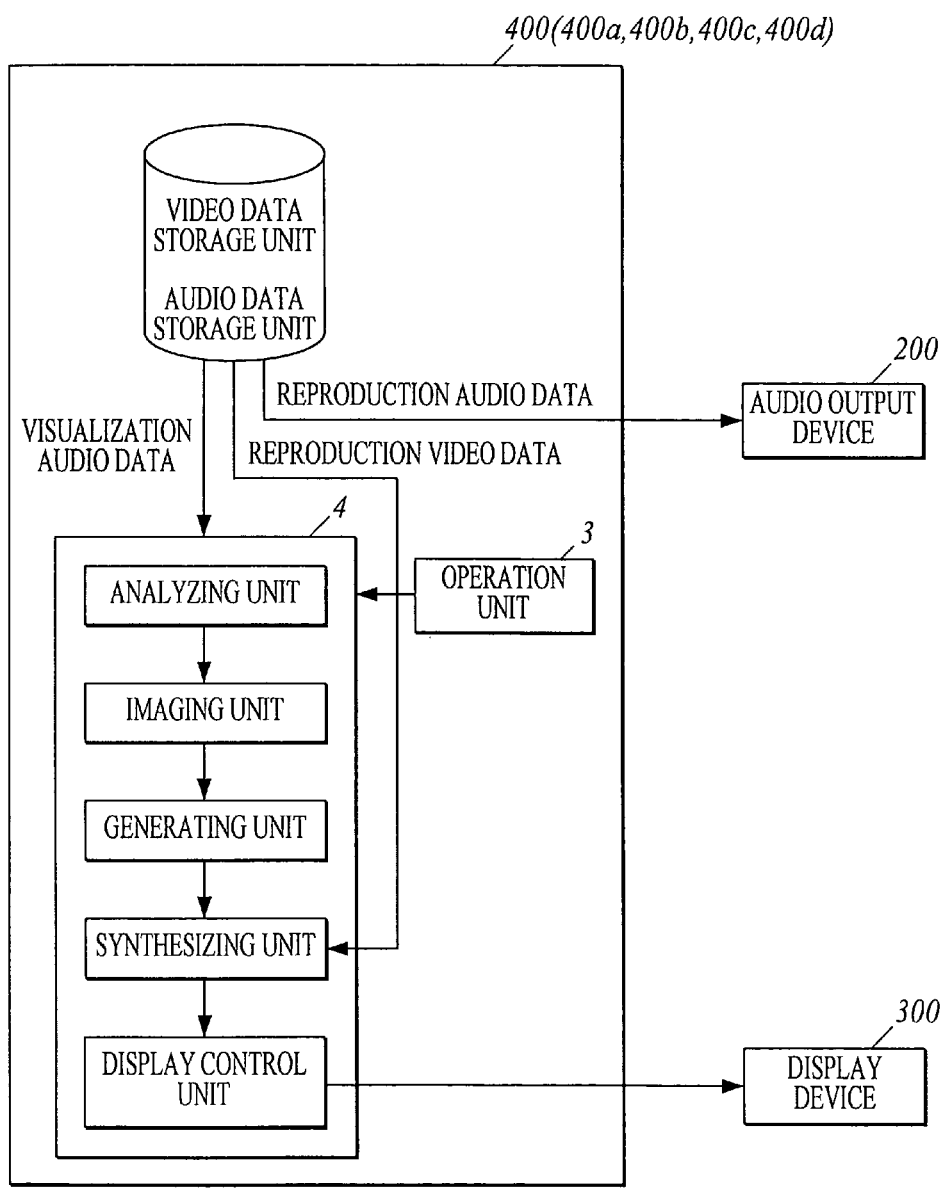
FIG. 5 is a diagram illustrating a structure of an internal structure of an audio and video data reproducing apparatus according to a second embodiment of the invention.

First, a structure of the audio and video data reproducing apparatus 400 according to a second embodiment of the invention will be described with reference to FIG. 5. The audio and video data reproducing apparatus 400 includes, for example, a video data storage unit that stores video data, and an audio data storage unit that stores audio data. The audio and video data reproducing apparatus 400 further includes a control unit 4 and an operation unit 3. The control unit 4 includes an analyzing unit that analyzes audio data stored in an audio data recording unit, an imaging unit that converts an analysis result obtained by the analyzing unit into image data, a generating unit that generates an audio image arrangement diagram A1 in which an audio image B based on the image data imaged by the imaging unit is arranged so as to correspond to a relative time axis based on a current time point, a synthesizing unit that synthesizes the audio image arrangement diagram A1 generated by the generating unit and the video A2 based on the video data stored in the video data storage unit so as to generate a synthesized image A3, and a display control unit that displays the synthesized image A3 generated by the synthesizing unit on a display device 300.

Figure 6:
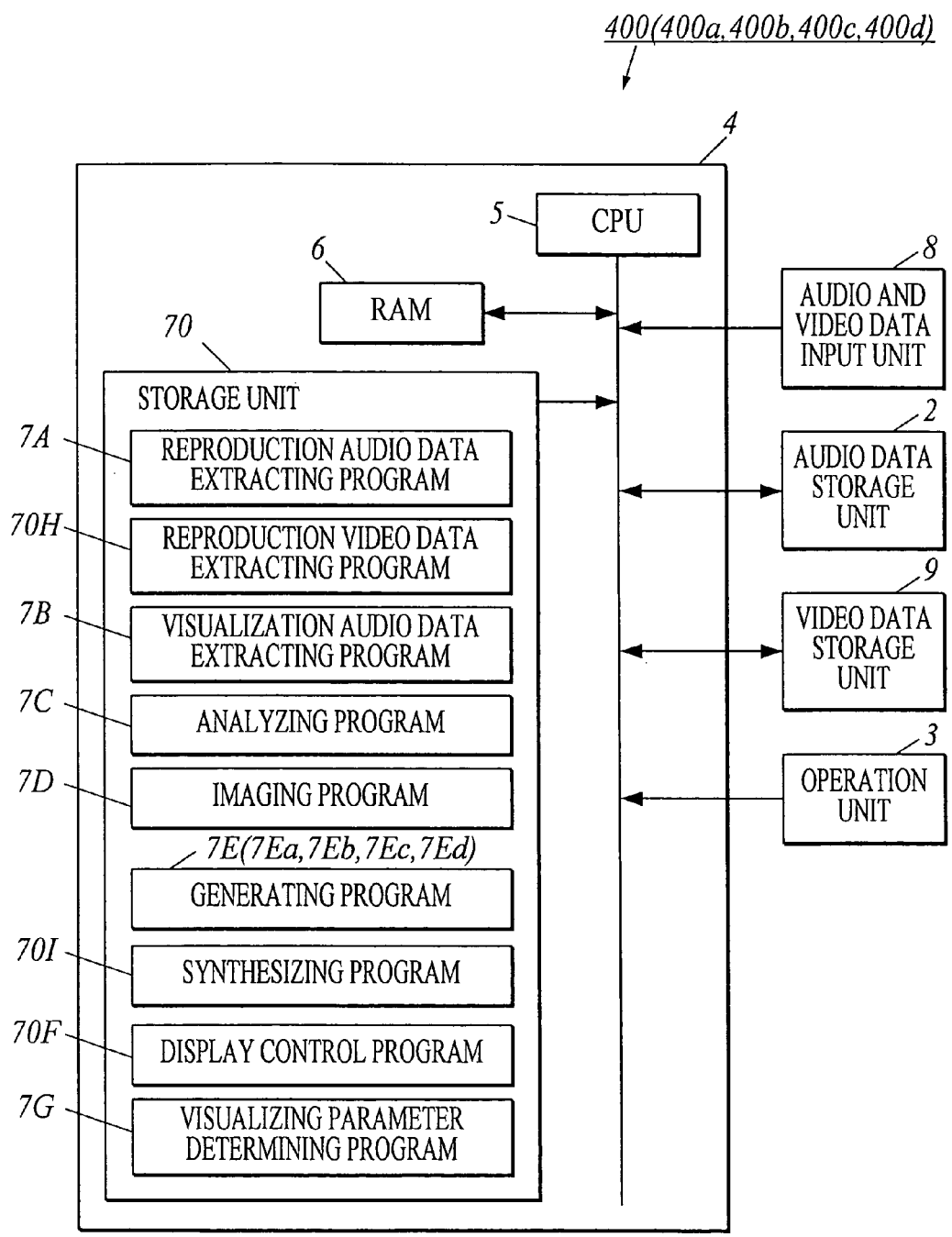
FIG. 6 is a diagram illustrating an inner structure of an audio and video data reproducing apparatus according to a second embodiment of the invention.

Next, a specific structure of the audio and video data reproducing apparatus 400 according to the second embodiment of the invention will be described with reference to FIG. 6. As shown in FIG. 6, the audio and video data reproducing apparatus 400 is different from the audio data reproducing apparatus 100 according to the first embodiment in only structures of an audio and video data input unit 8, a video data storage unit 9, and a storage unit 70. Therefore, the same constituent elements of the audio and video data reproducing apparatus 400 according to the second embodiment as those of the audio data reproducing apparatus 100 according to the first embodiment will be denoted by the same reference numerals, and the description thereof will be omitted.

The audio and video data input unit 8 includes, for example, a tuner or the like. The audio and video data input unit 8 receives a broadcasting wave, such as digital broadcasting or the like, outputs audio data included in the broadcasting wave to the audio data storage unit 2, and outputs the video data included in the broadcasting wave to the video data storage unit 9.

Examples of the video data storage unit 9 may include a CD, a DVD, an HDD, a semiconductor memory, a memory card, and the like. The video data storage unit 9 stores temporally continuous video data in a state in which it is associated with the audio data stored in the audio data storage unit 2, and serves as a video data storage unit. Specifically, the video data storage unit 9 stores temporally continuous video data accumulated in the CD, the DVD, or the like, or video data sequentially input by the audio and video data input unit 8.

The storage unit 70 has a recording medium (not shown) in which programs or data is stored in advance, and the recording medium is composed of, for example, a semiconductor memory. Further, the storage unit 70 stores various data and various programs that allow the CPU 5 to perform a function of controlling the whole audio and video data reproducing apparatus 400, and data processed by executing the programs. Specifically, as shown in FIG. 6, the storage unit 70 stores, for example, a reproduction audio data extracting program 7A, a reproduction video data extracting program 70H, a visualization audio data extracting program 7B, an analyzing program 7C, an imaging program 7D, a generating program 7E, a synthesizing program 70I, a display control program 7F, a visualizing parameter determining program 7G, or the like.

The reproduction video data extracting program 70H is a program that allows the CPU 5 to perform a function of retrieving the video data storage unit 9 based on an operation signal input by the operation unit 3 so as to extract reproduction video data.

The synthesizing program 70I is a program that allows the CPU 5 to perform a function of synthesizing the audio image arrangement diagram A1 generated by executing the generating program 7E and video A2 based on the video data stored in the video data storage unit 9 so as to generate a synthesized image A3. The CPU 5 executes the synthesizing program 70I so as to function as the synthesizing unit.

The display control program 70F is a program that allows the CPU 5 to perform a function of displaying the synthesized image A3 generated by executing the synthesizing program 70I on the display device 300 including a liquid crystal panel. The CPU 5 executes the display control program 70F so as to function as a display control unit.

Figure 7:
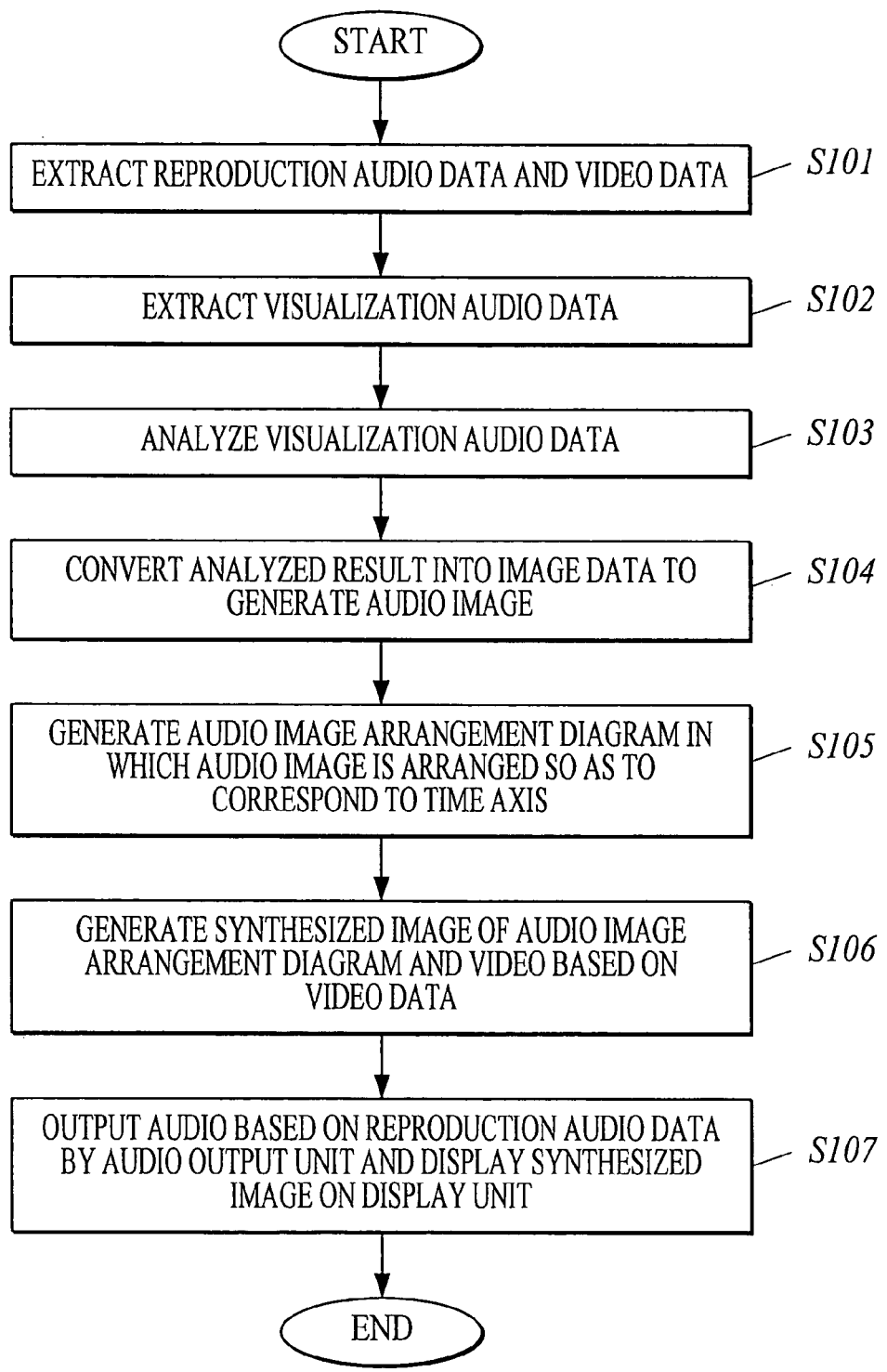
FIG. 7 is a diagram illustrating an operation of an audio and video data reproducing apparatus according to a second embodiment of the invention.

Next, a visualizing operation (reproducing operation) of the audio data in the audio and video data reproducing apparatus 400 that has the above-described structure will be described with reference to the flowchart illustrated in FIG. 7.

First, the CPU 5 executes the reproduction audio data extracting program 7A and the reproduction video data extracting program 70H, retrieves the audio data storage unit 2 based on the operation signal input by the operation unit 3 to extract the reproduction audio data, and retrieves the video data storage unit 9 to extract the reproduced video data (step S101).

The CPU 5 executes the visualization audio data extracting program 7B, retrieves the audio data storage unit 2 based on the operation signal input by the operation unit 3, and extracts the audio data within a prerequisite time necessary for generating the audio image B, for example, the audio data within the predetermined time ranging from a current time point to the time point later than the current time point (step S102).

The CPU 5 executes the analysis program 7C to analyze the audio data extracted in step S102 (step S103).

The CPU 5 executes the imaging program 7D, and converts the result obtained by analyzing the audio data in step S103 into image data set in advance to correspond to the analysis result (step S104).

The CPU 5 executes the generating program 7E, generates the audio image arrangement diagram A1 in which the audio image B based on the image data obtained by imaging the analyzed result in step S104 is arranged so as to correspond to the relative time axis based on the current time, and synthesizes an index S indicating the location (current time point) of the audio image B of the currently reproduced audio data in the audio image arrangement diagram A1 to the audio image arrangement diagram A1 (step S105).

The CPU 5 executes the synthesizing program 70I, and generates a synthesized image A3 obtained by synthesizing the audio image arrangement diagram A1 generated in step S105 and the video A2 based on the video data extracted in step S101 (step S106).

The CPU 5 outputs the audio based on the reproduction audio data extracted in step S101 to the audio output device 200, and executes the display control program 70F to display the synthesized image A3 generated in step S106 on the display device 300 (step S107).

Figure 8:
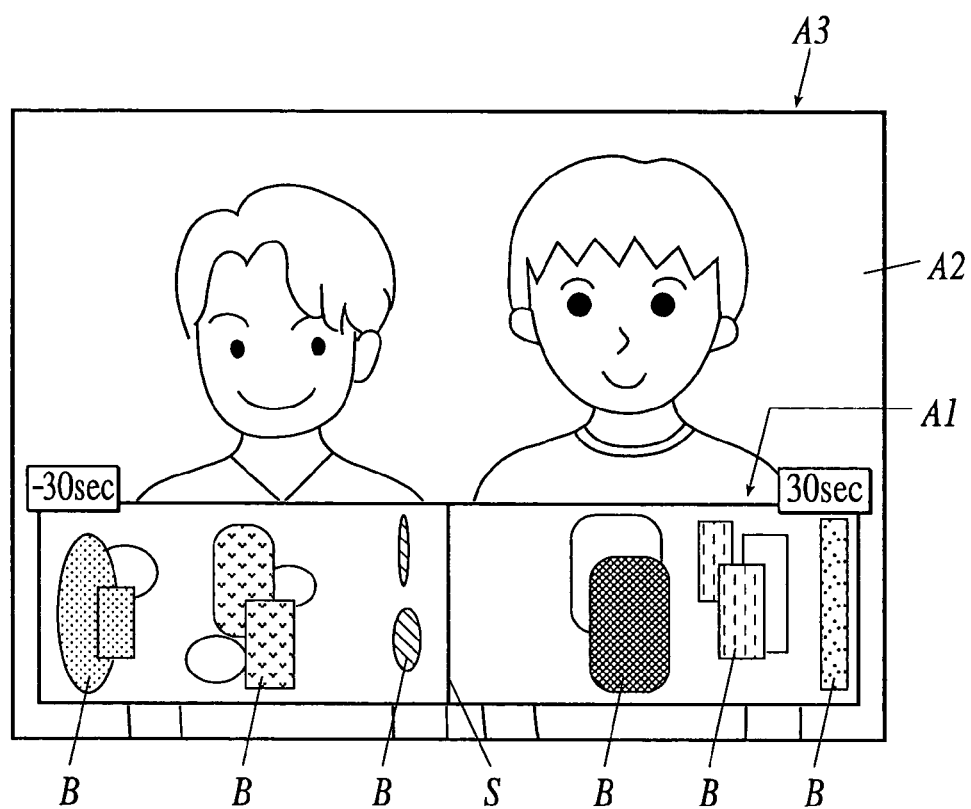
FIG. 8 is a diagram illustrating an example of a synthesized image that is displayed on a display device by an audio and video reproducing data device according to a second embodiment of the invention.

In step S107, an example of the synthesized image A3 that is displayed on the display device 300 is shown in FIG. 8. In FIG. 8, the video A2 based on the video data is displayed on the entire display screen of the display device 300, and the audio image arrangement diagram A1 is displayed on a predetermined portion (for example, lower portion in FIG. 8) of the screen of the display device 300 so as to overlap the video A2 based on the video data. In addition, in the audio image arrangement diagram A1 shown in FIG. 8, a horizontal axis becomes a relative time axis based on the current time point indicating the passage of time, the intensity of the audio and the tone color are represented by a size and a shape of each audio image B arranged along the time axis, and the fundamental frequency is represented by the color of each audio image B. In addition, the user can recognize the intensity of the audio data, the tone color, and the fundamental frequency by the size, the shape, and the color of the audio image B, from the audio image arrangement diagram A1 shown in FIG. 8.

Further, in the audio image arrangement diagram A1 of FIG. 8, an index S that indicates a location (current time point) of the audio image B of the currently reproduced audio data in the audio image arrangement diagram A1 is displayed.

According to the audio and video data reproducing apparatus 400 according to the second embodiment of the invention having the above-described structure, the same effects as the audio data reproducing apparatus 100 according o the first embodiment of the invention can be obtained. In particular, the video data is stored in the video data storage unit 9 in a state in which it is associated with the audio data. The CPU 5 executes the synthesizing program 70I to generate a synthesized image A3 in which the generated audio image arrangement diagram A1 and the video A2 based on the video data stored in the video data storage unit 9 are synthesized. When the audio based on the audio data is output from the audio output device 200, the CPU 5 executes the display control program 70F, so that the generated synthesized image A3 is output to the display device 300. As a result, the user can recognize the video A2 and the audio image arrangement diagram A1, so that the user can easily recognize the contents of the continuous audio data by using the audio image arrangement diagram A1.

The audio and video data reproducing apparatus 400 according to the second embodiment of the invention will be modified as follows.

First Modification

In the audio and video data reproducing apparatus 400a according to the first modification of the second embodiment, only the generating program 7Ea is modified.

Similar to the second embodiment, the generating program 7Ea according to the first modification is a program that allows the CPU 5 to perform a function of executing the imaging program 7D to generate the audio image arrangement diagram A1 in which the audio image B based on the image data obtained by imaging the analysis result is arranged to so as to correspond to the relative time axis based on the current time point, and synthesizing the index S indicating the current time point to the audio image arrangement diagram A1.

Further, the generating program 7Ea according to the first modification is a program that allows the CPU 5 to perform a function of changing the scale of the time axis of the audio image arrangement diagram A1 according to the reproduction speed of the audio data. Specifically, the generating program 7Ea is a program that allows the CPU 5 to perform a function of reducing the scale of the time axis of the audio image arrangement diagram A1 in proportion to the reproduction speed of the audio data. The CPU 5 executes the generating program 7Ea so as to function as the generating unit.

Figure 9A:
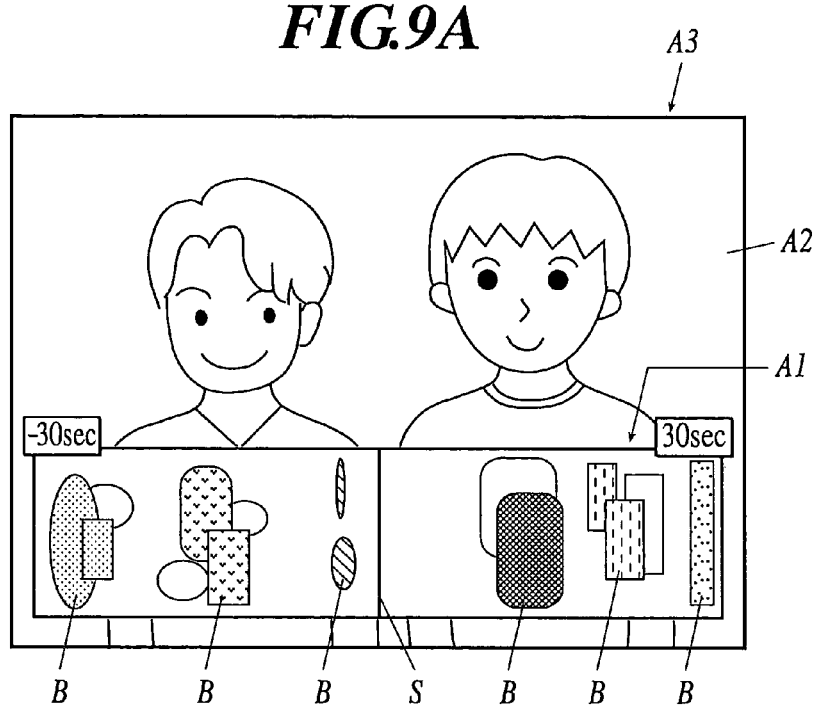
FIGS. 9A and 9B are diagrams illustrating an example of a synthesized image that is displayed on a display device by an audio and video reproducing data device according to a first modification of the invention.
Figure 9B:
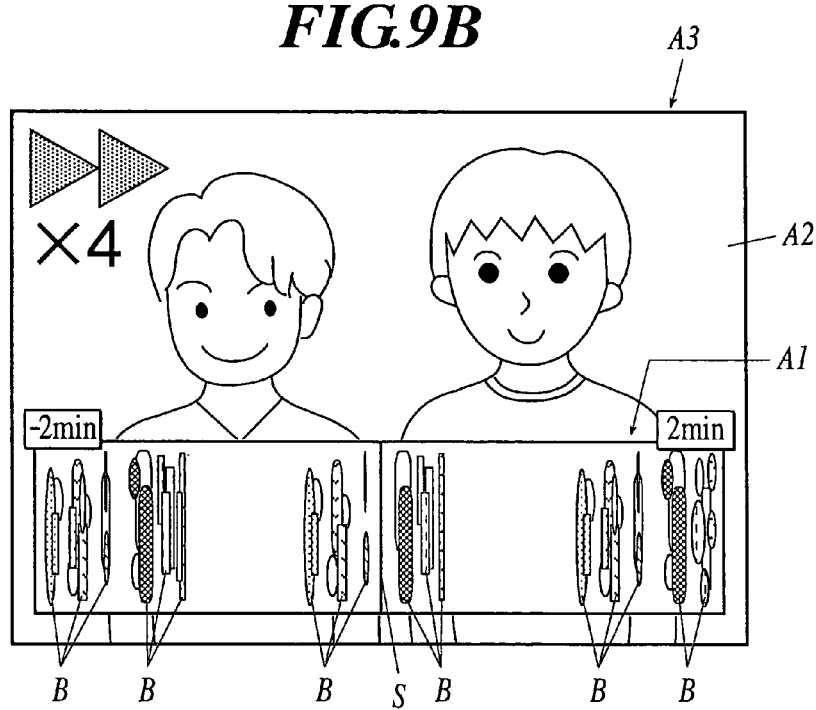

Next, the synthesized image A3 that is displayed on the display device 300 by the audio and video data reproducing apparatus 400a according to the first modification will be described. An example of the synthesized image A3 according to the first modification when the reproduction speed of the audio data is a general speed is shown in FIG. 9A, and an example of the synthesized image A3 according to the first modification when the reproducing the audio data is fast-forward reproducing is shown in FIG. 9B.

Similar to the second embodiment, in the synthesized image A3 according to the first modification, the video A2 based on the video data is displayed on the entire display screen of the display device 300, and the audio image arrangement diagram A1 is displayed on a predetermined portion (for example, lower portion in FIGS. 9A and 9B) of the display screen of the display device 300 so as to overlap the video A2 based on the video data. In addition, in the audio image arrangement diagram A1 according to the first modification, a horizontal axis becomes a relative time axis based on the current time point indicating the passage of time, the intensity of the audio and the tone color are represented by a size and a shape of each audio image B arranged along the time axis, the fundamental frequency in the analyzed result is represented by the color of each audio image B, and the index S indicating the current time point is displayed.

Further, the scale of the time axis of the audio image arrangement diagram A1 according to the first modification is changed such that it is reduced in proportion to the reproduction speed of the audio data. For example, when the reproduction speed of the audio data is a general speed, the scale of the time axis of the audio image arrangement diagram A1 ranges from 30 seconds from the past to the current time point to 30 seconds toward the future from the current time point (FIG. 9A), and when the reproduction speed of the audio data is a fast-forward speed (for example, 4× reproducing), the scale of the time axis of the audio image arrangement diagram A1 ranges from two minutes from the past to the current time point to the two minutes toward the future from the current time point (FIG. 9B).

In addition, since the scale of the time axis of the audio image arrangement diagram A1 is changed to be reduced in proportion to the reproduction speed of the audio data, regardless of the reproduction speed, the speed at which the audio image B at the right end (first future side) of the audio image arrangement diagram A1 moves to the left end (first past side) of the audio image arrangement diagram A1 along the time axis becomes constant.

According to the audio and video data reproducing apparatus 400a according to the first modification of the second embodiment of the invention having the above-described structure, the same effects as the audio and video data reproducing apparatus 400 according to the second embodiment can be obtained. In particular, the CPU 5 executes the generating program 7Ea, so that the scale of the time axis of the audio image arrangement diagram A1 is changed according to the reproduction speed of the audio data. As a result, the speed at which the audio image B in the audio image arrangement diagram A1 moves along the time axis does become constant without depending on the reproduction speed of the audio data, the proper audio image arrangement diagram A1 according to the reproduction speed of the audio data can be displayed on the display device 300, and the user can easily recognize the contents of the audio data from the audio image arrangement diagram A1. Specifically, the speed at which the audio image B in the audio image arrangement diagram A1 moves along the time axis is constant without depending on the reproduction speed of the audio data, and the audio image arrangement diagram A1 in which the actual passage time at the current reproduction speed is indicated by the horizontal axis is displayed. That is, "what change occurs in sounds after some seconds when the operation is continued in this state" can be informed to the user. Therefore, the user can easily plan the next operation.

Second Modification

In the audio and video data reproducing apparatus 400*b* according to the second modification of the second embodiment, only the generating program 7Eb is modified.

Similar to the second embodiment, the generating program 7Eb according to the second modification is a program that allows the CPU 5 to perform a function of executing the imaging program 7D to generate the audio image arrangement diagram A1 in which the audio image B based on the image data obtained by imaging the analysis result is arranged so as to correspond to the relative time axis based on the current time point, and synthesizing the index S indicating the current time point to the audio image arrangement diagram A1.

Further, the generating program 7Eb according to the second modification is a program that allows the CPU 5 to perform a function of generating the two or more of the audio image arrangement diagrams A1 in which the scales of the time axes are different from each other. The CPU 5 executes the generating program 7Eb to function as the generating unit.

Next, the synthesized image A3 that is displayed on the display device 300 by the audio and video data reproducing apparatus 400*b* according to the second modification will be described.

Similar to the second embodiment, in the synthesized image A3 according to the second modification, the video A2 based on the video data is displayed on the entire display screen of the display device 300, and the audio image arrangement diagram A1 is displayed on a predetermined portion (for example, lower portion in FIG. 10) of the screen of the display device 300 so as to overlap the video A2 based on the video data. Further, in the audio image arrangement diagram A1 according to the second modification, for example, a horizontal axis becomes a relative time axis based on the current time point indicating the passage of time, the intensity of the audio and the tone color are represented by a size and a shape of each audio image B arranged along the time axis, the fundamental frequency in the analyzed result is represented by the color of each audio image B, and the index S indicating the current time point is displayed.

Figure 10:
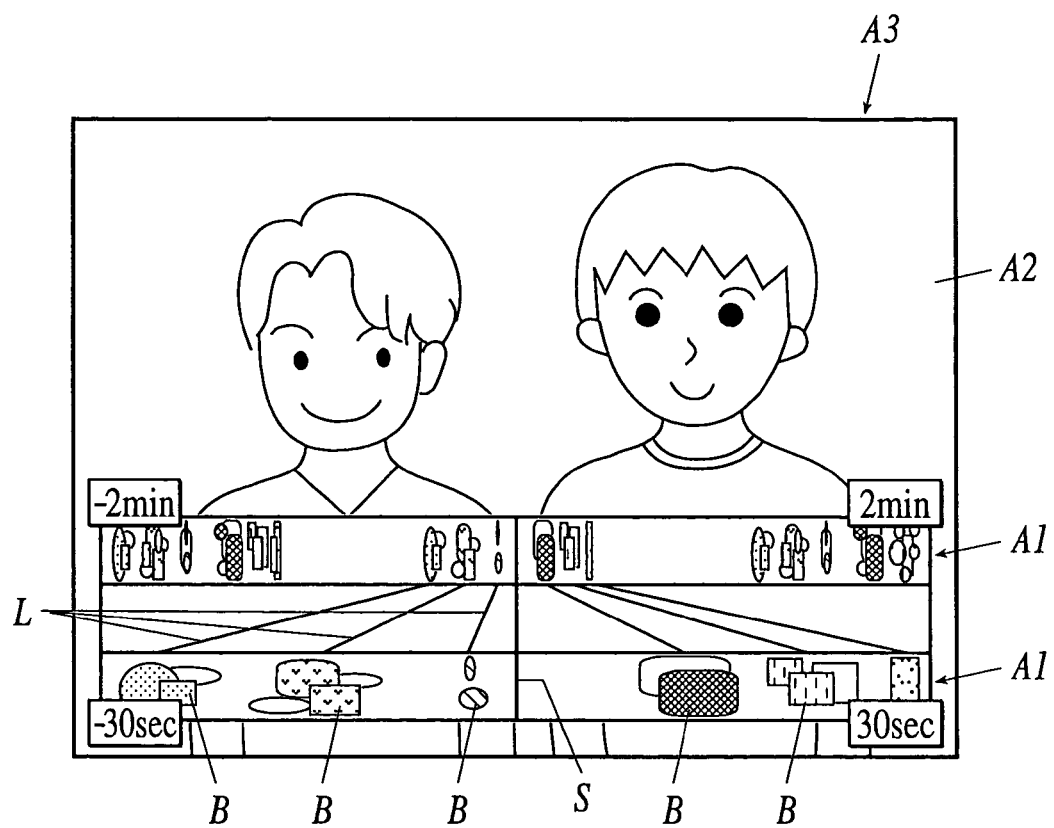
FIG. 10 is a diagram illustrating an example of a synthesized image that is displayed on a display device by an audio and video reproducing data device according to a second modification of the invention.

Further, in the synthesized image A3 according to the second modification, two or more of the audio image arrangement diagrams A1 in which the time axes are different from each other are displayed. For example, as shown in FIG. 10, the audio image arrangement diagram A1 (for example, −30 to 30 seconds in FIG. 10) in which the scale of the time axis is large, and the audio image arrangement diagram A1 (for example, −2 to 2 minutes in FIG. 10) in which the scale of the time axis is small are arranged in a vertical direction to be displayed on the lower portion of the screen of the display device 300. Further, a segment of a line L that connects predetermined time points is displayed between the audio image arrangement diagrams A1 arranged in a vertical direction, such that the comparison between scales of the time axes of the audio image arrangement diagrams A1 is easy.

In addition, in the audio and video data reproducing apparatus 400*b* according to the second modification, two or more of the audio image arrangement diagrams A1 in which the time axes are different from each other are displayed on the display device 300. For example, when the reproduction speed of the audio data is changed, the scale of the time axis of one audio image arrangement diagram A1 is changed according to the reproduction speed, so that the audio image arrangement diagram A1 having the scale of the time axis at the general reproduction speed and the audio image arrangement diagram A1 having the scale of the time axis at the reproduction speed after the change are simultaneously displayed. Specifically, when the reproduction speed of the audio data is changed, only the scale of the time axis of one audio image arrangement diagram A1 is changed according to the reproduction speed, and the scale of the time axis of the other audio image arrangement diagram A1 is determined according to the general reproduction speed. As a result, even when the reproduction speed is changed, the audio image B is always displayed on the scale of the time axis corresponding to the general reproduction speed in the other audio image arrangement diagram A1. Therefore, it is possible to prevent eye fatigue which occurs due to the phenomenon when the scale of the time axis of the audio image arrangement diagram A1 dizzyingly changes, whenever the reproduction speed changes.

According to the audio and video data reproducing apparatus 400*b* according to the second modification of the second embodiment of the invention, the same effects as the audio and video data reproducing apparatus 400 according to the second embodiment can be obtained. In particular, the CPU 5 executes the generating program 7Eb, and thus the two or more of the audio image arrangement diagrams A1 in which the scales of the time axes are different from each other are generated. The CPU 5 executes the display control program 70F, and thus two or more of the audio image arrangement diagrams A1 in which the scales of the time axes are different from each other can be simultaneously displayed on the display device 300. Therefore, the user can select the desired audio image arrangement diagram A1 from two or more of the audio image arrangement diagrams A1 in which the scales of the time axes are different from each other, if necessary, and easily recognize the contents of the audio data from the selected audio image arrangement diagram A1.

Third Modification

In the audio and video data reproducing apparatus 400*c* according to the third modification of the second embodiment, only the generating program 7Ec is modified.

Similar to the second embodiment, the generating program 7Ec according to the third modification is a program that allows the CPU 5 to perform a function of executing the imaging program 7D to generate the audio image arrangement diagram A1 in which the audio image B based on the image data obtained by imaging the analysis result is arranged so as to correspond to the relative time axis based on the current time point, and synthesizing the index S indicating the current time point to the audio image arrangement diagram A1.

Further, the generating program 7Ec according to the third modification is a program that allows the CPU 5 to perform a function of generating the audio image arrangement diagram A1 in which the horizontal axis is the relative time axis based on the current time point, and the scale of the time axis gradually varies in the longitudinal axis direction. The CPU 5 executes the generating program 7Ec to serve as the generating unit.

Next, the synthesized image A3 that is displayed on the display device 300 by the audio and video data reproducing apparatus 400*c* according to the third modification will be described.

Similar to the second embodiment, in the synthesized image A3 according to the third modification, the video A2 based on the video data is displayed on the entire display screen of the display device 300, and the audio image arrangement diagram A1 is displayed on a predetermined portion (for example, lower portion in FIG. 11) of the screen of the display device 300 so as to overlap the video A2 based on the video data. Further, in the audio image arrangement diagram A1 according to the third modification, a horizontal axis becomes a relative time axis based on the current time point indicating the passage of time, and the index S indicating the current time point is displayed.

Figure 11:
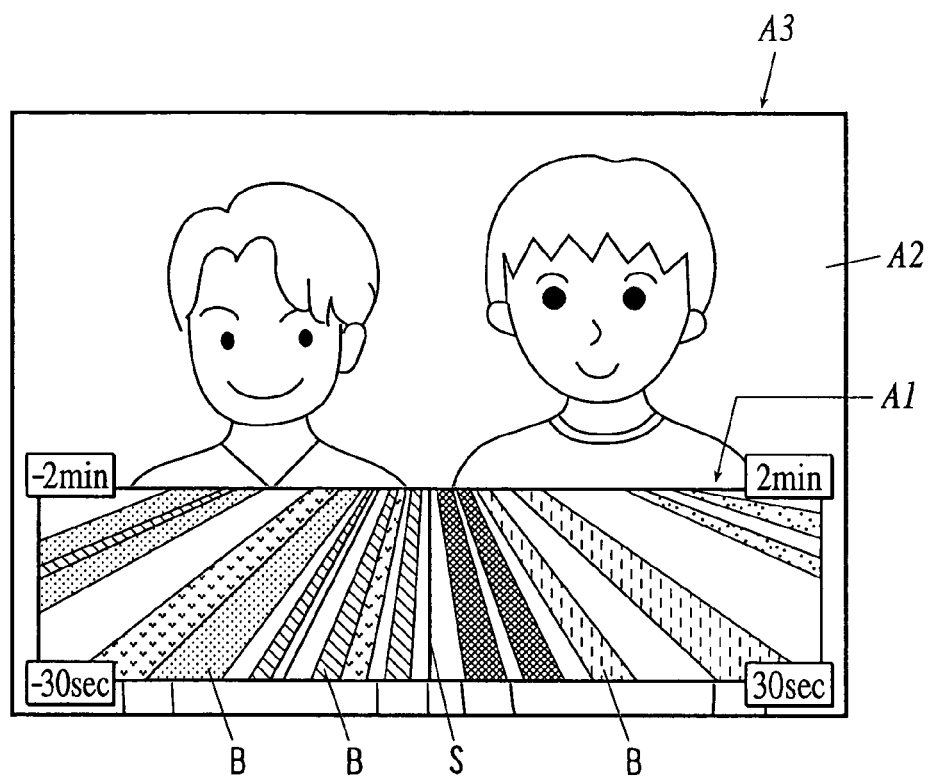
FIG. 11 is a diagram illustrating an example of a synthesized image that is displayed on a display device by an audio and video reproducing data device according to a third modification of the invention.

Further, in the audio image arrangement diagram A1 according to the third modification, the scale of the time axis gradually varies in the longitudinal axis direction, and thus the horizontal width of each audio image B varies. For example, as shown in FIG. 11, when progressing toward the upper side of the audio image arrangement diagram A1 in the longitudinal direction, the scale of the time axis is reduced, and when progressing toward the upper side of the audio image arrangement diagram A1 in the longitudinal direction, the horizontal width of each audio image B is reduced. In this case, the shape of the audio image B is continuous in the longitudinal direction, and thus the intensity of the audio data cannot be recognized from the corresponding shape. However, the fundamental frequency of the audio data and the tone colors (for example, different by the voice and the music) can be recognized from the color and the luminance of the audio image B.

According to the audio and video data reproducing apparatus 400c according to the third modification of the second embodiment of the invention, the same effects as the audio and video data reproducing apparatus 400 according to the second embodiment can be obtained. In particular, the CPU 5 executes the generating program 7Ec to generate the audio image arrangement diagram A1 in which the scale of the time axis varies in the longitudinal axis direction of the audio image arrangement diagram A1. The CPU 5 executes the display control program 70F, and thus the audio image arrangement diagram A1 in which the scale of the time axis varies in the longitudinal axis direction is displayed on the display device 300. As a result, the user can recognize the plurality of audio image arrangement diagrams A1 in which scales of the time axes are different from each other from the one audio image arrangement diagram A1, and the user can reduce the stress of the eyes when viewing the plurality of independently divided audio image arrangement diagrams A1 in which the scales of the time axes are different from one another.

Fourth Modification

In the audio and video data reproducing apparatus 400d according to the fourth modification of the second embodiment, only the generating program 7Ed is modified.

Similar to the second embodiment, the generating program 7Ed according to the fourth modification is a program that allows the CPU 5 to perform a function of executing the imaging program 7D to generate the audio image arrangement diagram A1 in which the audio image B based on the image data obtained by imaging the analysis result is arranged so as to correspond to the relative time axis based on the current time point, and synthesizing the index S indicating the current time point to the audio image arrangement diagram A1.

Further, the generating program 7Ed according to the fourth modification is a program that allows the CPU 5 to perform a function of generating the audio image arrangement diagram A1 in which the reduced axis of the time axis is reduced from the time zone (hereinafter, referred to as first time zone) close to the current time point toward the time zone (hereinafter, referred to as second time zone) farther than the current time point than the first time zone. The CPU 5 executes the generating program 7Ed so as to function as the generating unit.

Next, the synthesized image A3 that is displayed on the display device 300 by the audio and video data reproducing apparatus 400d according to the fourth modification will be described.

Figure 12:
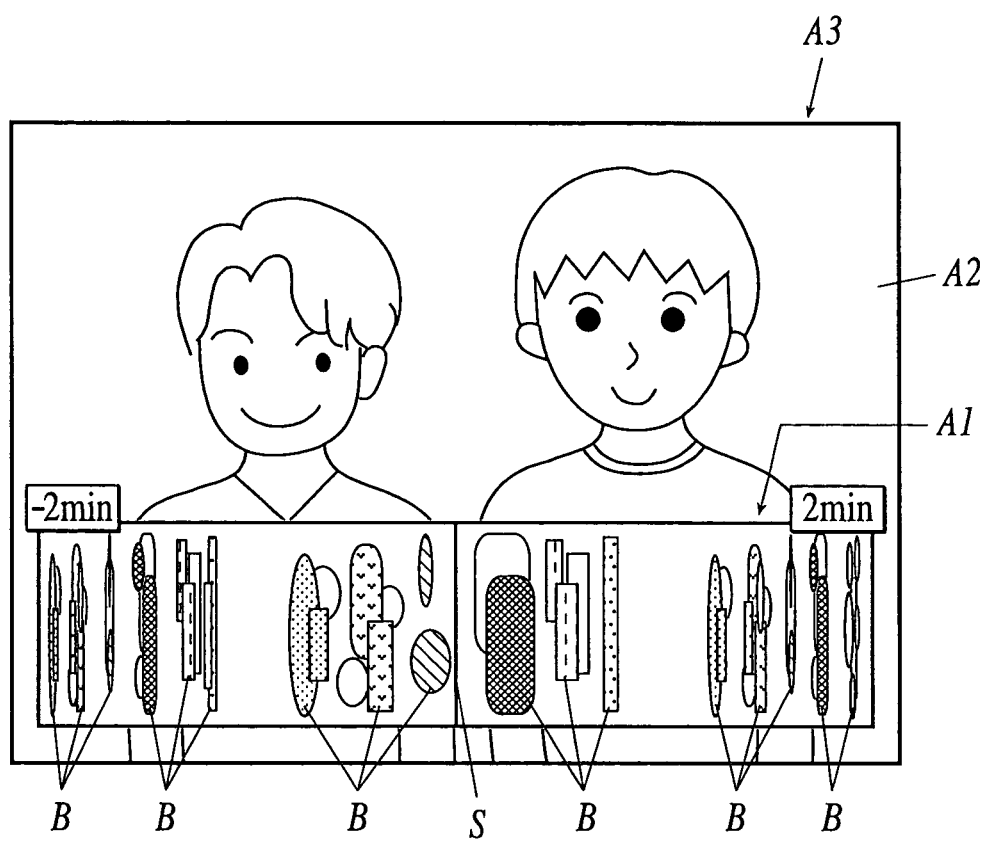
FIG. 12 is a diagram illustrating an example of a synthesized image that is displayed on a display device by an audio and video reproducing data device according to a fourth modification of the invention.

Similar to the second embodiment, in the synthesized image A3 according to the fourth modification, the video A2 based on the video data is displayed on the entire display screen of the display device 300, and the audio image arrangement diagram A1 is displayed on a predetermined portion (for example, lower portion in FIG. 12) of the screen of the display device 300 so as to overlap the video A2 based on the video data. Further, in the audio image arrangement diagram A1 according to the fourth modification, a horizontal axis becomes a relative time axis based on the current time point indicating the passage of time, the intensity of the audio and the tone color of the audio are represented by a size and a shape of each audio image B arranged along the time axis, the fundamental frequency in the analyzed result is represented by the color of each audio image B, and the index S indicating the current time point is displayed.

Further, in the audio image arrangement diagram A1 according to the fourth modification, the scale of the time axis of the audio image arrangement diagram A1 in the first time zone is larger than the scale of the time axis of the audio image arrangement diagram A1 in the second time zone.

According to the audio and video data reproducing apparatus 400d according to the fourth modification of the second embodiment of the invention, the same effects as the audio and video data reproducing apparatus 400 according to the second embodiment can be obtained. In particular, the CPU 5 executes the generating program 7Ed, and generates the audio image arrangement diagram A1 in which the reduced axis of the time axis is reduced from the first time zone toward the second time zone farther from the current time point than the first time zone. Therefore, the user can recognize contents of the audio data within the time zone (first time zone) close to the current time point, from the audio image arrangement diagram A1, and can recognize the contents of the audio data within the second time zone farther from the current time point.

Third Embodiment

Figure 13:
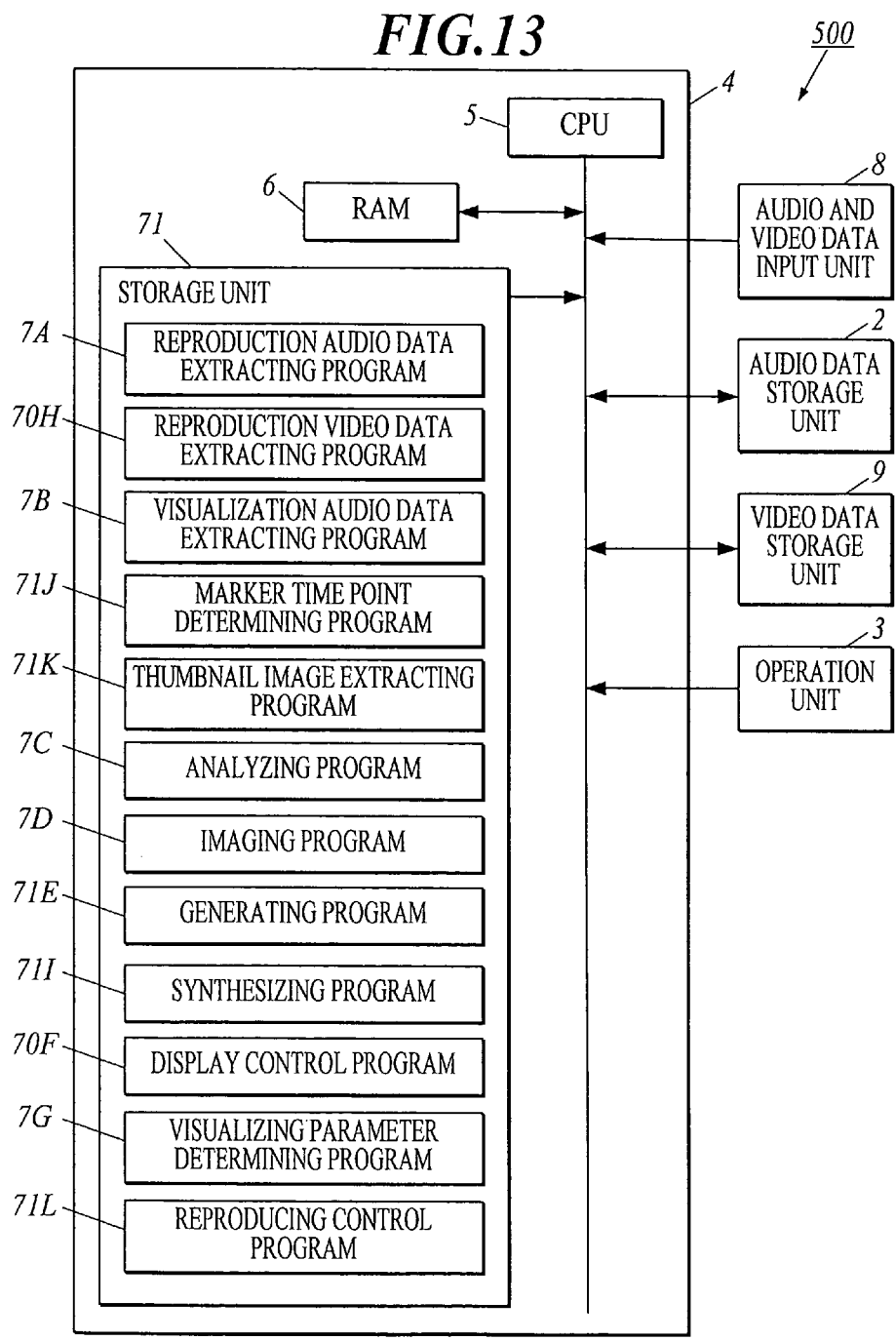
FIG. 13 is a block diagram illustrating a structure of a main body of an audio and video data reproducing apparatus according to a third embodiment of the invention.

First, a specific structure of an audio and video data reproducing apparatus 500 according to a third embodiment of the invention will be described with reference to FIG. 13. As shown in FIG. 13, since the audio and video data reproducing apparatus 500 is different from the audio and video data reproducing apparatus 400 according to the second embodiment in only a structure of the storage unit 71, the same constituent elements as the audio and video data reproducing apparatus 400 according to the second embodiment are denoted by the same reference numerals, and the description thereof will be omitted.

The storage unit 71 has a storage medium (not shown) in which a program or data is stored in advance, and the storage medium is composed of, for example, a semiconductor memory. Further, the storage unit 71 stores various data and various programs that achieve a function of causing the CPU 5 to control the entire audio and video data reproducing apparatus 500, and data processed by executing the programs. Specifically, as shown in FIG. 13, the storage unit 71 stores, for example, a reproduction audio data extracting program 7A, a reproduction video data extracting program 70H, a visualization audio data extracting program 7B, a marker time point determining program 71J, a thumbnail image extracting program 71K, an analyzing program 7C, an imaging program 7D, a generating program 71E, a synthesizing program 71I, a display control program 70F, a visualizing parameter determining program 7G, a reproducing control program 71L, or the like.

The marker determining program 71J is a program that allows the CPU 5 to perform a function of determining a location (marker time point) with respect to the time axis of the marker M synthesized with the audio image arrangement diagram A1. Specifically, the marker determining program 71J is a program that allows the CPU 5 to perform a function of analyzing the audio data with respect to the intensity of the audio and determining a time point when the intensity of the audio rapidly varies as the marker time point.

The thumbnail image extracting program 71K is a program that allows the CPU 5 to perform a function of retrieving the video data storage unit 9 to extract representative video data at a predetermined time. In this case, the predetermined time point refers to a time point when a scene varies or a marker time point that is determined by executing the marker time point determining program 71J by means of the CPU 5. The CPU 5 executes the thumbnail image extracting program 71K so as to function as the representative video data extracting unit.

The generating program 71E is a program that allows the CPU 5 to perform a function of executing the imaging program 7D to generate the audio image arrangement diagram A1 obtained by arranging the audio image B based on the image data obtained by imaging the analysis result to be associated with the relative time axis based on the current time point, and synthesizing the index S indicating the current time point to the audio image arrangement diagram A1.

Further, the generating program 71E is a program that allows the CPU 5 to perform a function of synthesizing the marker M indicating the marker time point with the audio image arrangement diagram A1. In this case, the marker M that is synthesized with the audio image arrangement diagram A1 is selected by pressing on the operation button of the operation unit 3 corresponding to the marker M by means of a user, and it is used for inputting an operation signal that sets the marker time point of the marker M selected by the user to the new reproducing start time point. The CPU 5 executes the generating program 71E so as to function as the generating unit.

The synthesizing program 71I is a program that allows the CPU 5 to perform a function of associating the generated audio image arrangement diagram A1, the video A2 based on the video data stored in the video data storage unit 9, and the image A4 based on the representative video data extracted by executing the thumbnail image extracting program 71K with the relative time axis based on the current time point to synthesize the audio image arrangement diagram A1, the video A2, and the image A4. The CPU 5 executes the synthesizing program 71I so as to function as the synthesizing unit.

The display control program 71L is a program that allows the CPU 5 to perform a function of starting the reproducing of the audio data from the reproducing start time point, when the user selects the operation button of the operation unit 3 corresponding to the marker M displayed on the audio image arrangement diagram A1 and an operation signal setting the marker time point of the selected marker M to the new reproducing time point is input. The CPU 5 executes the reproducing control program 71L so as to function as a reproducing control unit.

Figure 14:
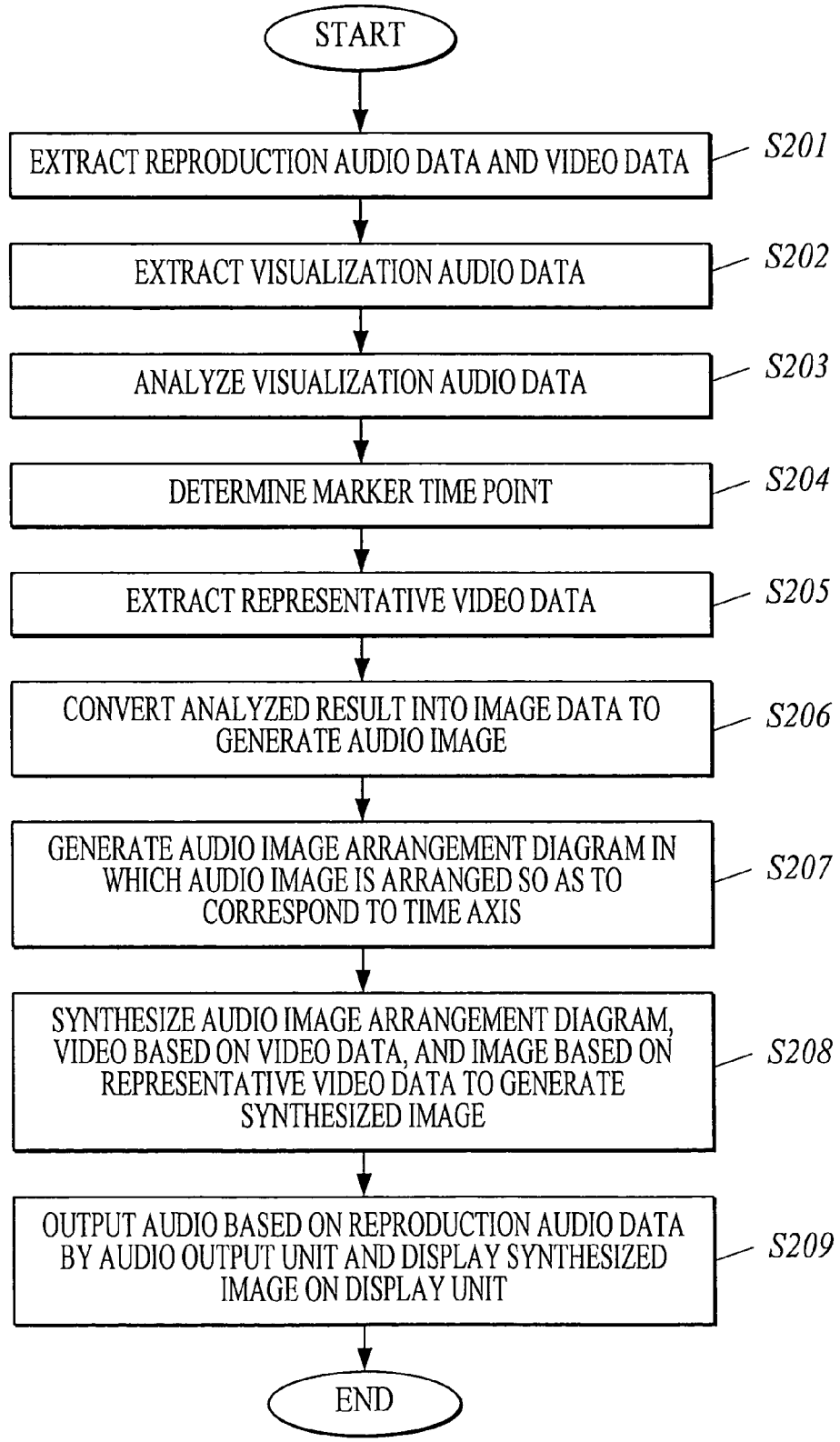
FIG. 14 is a block diagram illustrating an operation of an audio and video data reproducing apparatus according to a third embodiment of the invention.

Next, a visualizing operation (reproducing operation) in the audio and video data reproducing apparatus 500 that has the above-described structure will be described with reference to the flowchart illustrated in FIG. 14.

First, the CPU 5 executes the reproduction audio data extracting program 7A and the reproduction video data extracting program 70H, retrieves the audio data storage unit 2 based on the operation signal input from the operation unit 3 to extract the reproduction audio data, and retrieves the video data storage unit 9 to extract the reproduced video data (step S201).

The CPU 5 executes the visualization audio data extracting program 7B, retrieves the audio data storage unit 2 based on the operation signal input from the operation unit 3, and extracts the audio data within a prerequisite time necessary for generating the audio image B, for example, the audio data within the predetermined time from a current time point to the time point later than the current time point (step S202).

The CPU 5 executes the analysis program 7C to analyze the audio data extracted in step S202 (step S203).

The CPU 5 executes the marker time point determining program 71J to determine the marker time point becoming the reproducing start time point (step S204).

The CPU 5 executes the thumbnail image extracting program 71K to extract the representative video data (step S205).

The CPU 5 executes the imaging program 7D, and converts the result obtained by analyzing the audio data in step S203 into the image data set in advance to correspond to the analyzed result (step S206).

The CPU 5 executes the generating program 71E and generates the audio image arrangement diagram A1 in which the audio image B based on the image data obtained by imaging the analyzed result in step S206 is arranged so as to correspond to the relative time axis based on the current time point. In addition, the CPU 5 synthesizes with the audio image arrangement diagram A1 an index S indicating the location (current time point) in the audio image arrangement diagram A1 of the audio image B of the currently reproduced audio data and a marker M indicating a marker time point (step S207).

The CPU 5 executes the synthesizing program 71I, and associates the audio image arrangement diagram A1 generated in step S207, the video A2 based on the video data extracted in step S201, and the video A4 based on the representative video data extracted in step S205 with the relative time axis based on the current time point to generate the synthesized image A3 (step S208).

The CPU 5 outputs the audio based on the reproduction audio data extracted in step S201 to the audio output device 200, and executes the display control program 70F to display the synthesized image A3 generated in step S208 on the display device 300 (step S209).

Figure 15:
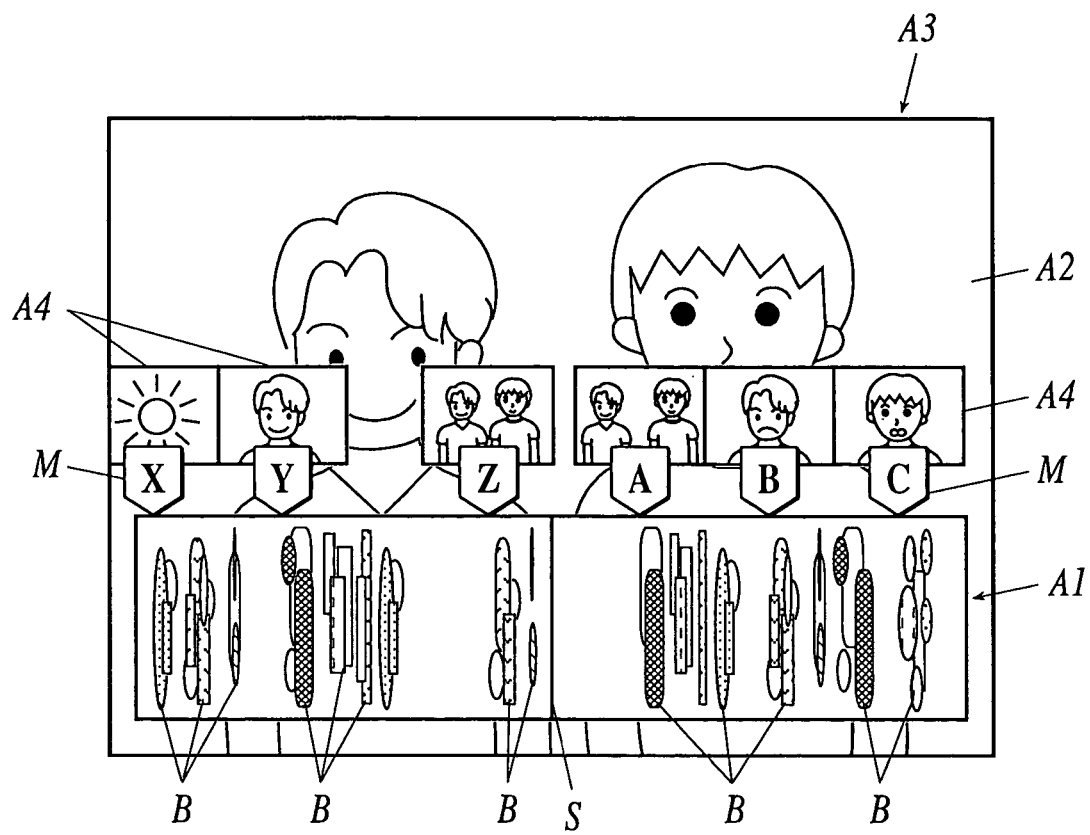
FIG. 15 is a diagram illustrating an example of a synthesized image that is displayed on a display device by an audio and video reproducing data device according to a third embodiment of the invention.

In step S209, an example of the synthesized image A3 that is displayed on the display device 300 is shown in FIG. 15. In FIG. 15, the video A2 based on the video data is displayed on the entire display screen of the display device 300, and the audio image arrangement diagram A1 is displayed on a predetermined portion (for example, lower portion in FIG. 15) of the screen of the display device 300 so as to overlap the video A2 based on the video data. In addition, in the audio image arrangement diagram A1, a horizontal axis becomes a relative time axis based on the current time point indicating the passage of time, the intensity and the tones of the audio are represented by a size and a shape of each audio image B arranged along the time axis, and the fundamental frequency in the analysis result is represented by the color of each audio image B. In addition, the index S indicating the current time point is displayed.

Further, in the audio image arrangement diagram A1, the marker M indicating the marker time point is displayed along the time axis. The marker M is shown by alphabet display, such as A, B, C, ..., or figure display, and the user selects the operation button of the operation unit 3 corresponding to the marker M, such that the marker M is selected.

Further, in the synthesized image A3, the video A4 based on the representative video data is displayed along the time axis direction of the audio image arrangement diagram A1. In FIG. 15, the video data corresponding to the marker time point is extracted as the representative video data, and the image A4 on the corresponding representative video data is displayed on an upstream of the marker M.

Figure 16:
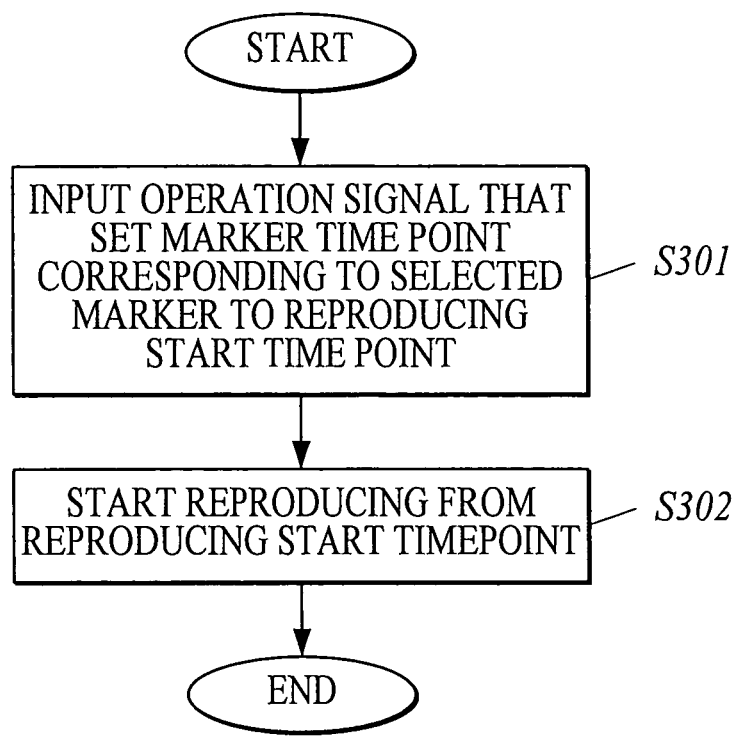
FIG. 16 is a flowchart illustrating an operation of an audio and video data reproducing apparatus according to a third embodiment of the invention.

Next, a reproducing control operation of the audio data and the video data in the audio and video data reproducing apparatus 500 according to the third embodiment of the invention will be described with reference to the flowchart shown in FIG. 16.

When the user operates the operation unit 3, the marker M is selected. In this case, if an operation signal setting the marker time point of the marker M to the new reproducing start time point is input (step S301), the CPU 5 executes the reproducing control program 71L, and starts the reproducing of the audio and the video data from the corresponding reproducing start time point (step S302).

According to the audio and video data reproducing apparatus 500 according to the third embodiment of the invention having the above-described structure, the same effects as the audio and video data reproducing apparatus 400 according to the second embodiment of the invention can be obtained. In particular, the audio and video reproducing apparatus 500 according to the third embodiment further includes an operation unit 3 that outputs an operation signal by operation of the user. The CPU 5 executes the generating program 71E, so that the marker M indicating the reproducing start time point is synthesized with the audio image arrangement diagram A1, and the CPU 5 executes the reproducing control program 71L, so that the output starts from the reproducing start time point shown in the marker M based on an operation signal selecting the marker output from the operation unit 3. Therefore, the user selects the marker M in the audio image arrangement diagram A1, so that the user can easily reproduce the audio data within the predetermined time.

Further, the CPU 5 executes the thumbnail image extracting program 71K, so that the representative video data at the predetermined time point is extracted from the video data storage unit 9, and the CPU 5 executes the synthesized program 71I, so that the generated audio image arrangement diagram A1, the video A2 based on the video data stored in the storage unit 9, and the image A4 based on the extracted representative video data are associated with the relative time axis based on the current time point to be synthesized. As a result, the image A4 based on the representative video data is displayed on the audio image arrangement diagram A1, and thus the user can more easily recognize the location in the audio image arrangement diagram of the desired audio data by the image A4 based on the representative video data displayed on the audio image arrangement diagram A1, and can easily reproduce the audio data within the predetermined time.

Further, in this embodiment, a time point when the intensity of the audio rapidly varies by analyzing the audio data with respect to the intensity of the audio has been exemplified as the marker time point that is determined by causing the CPU 5 to execute the marker time point determining program 71J, and the invention is not limited thereto. For example, the marker time point may be determined per predetermined time interval.

Fourth Embodiment

In the fourth embodiment, a DVD 600 is exemplified as a storage medium according to an embodiment of the invention.

Figure 17:
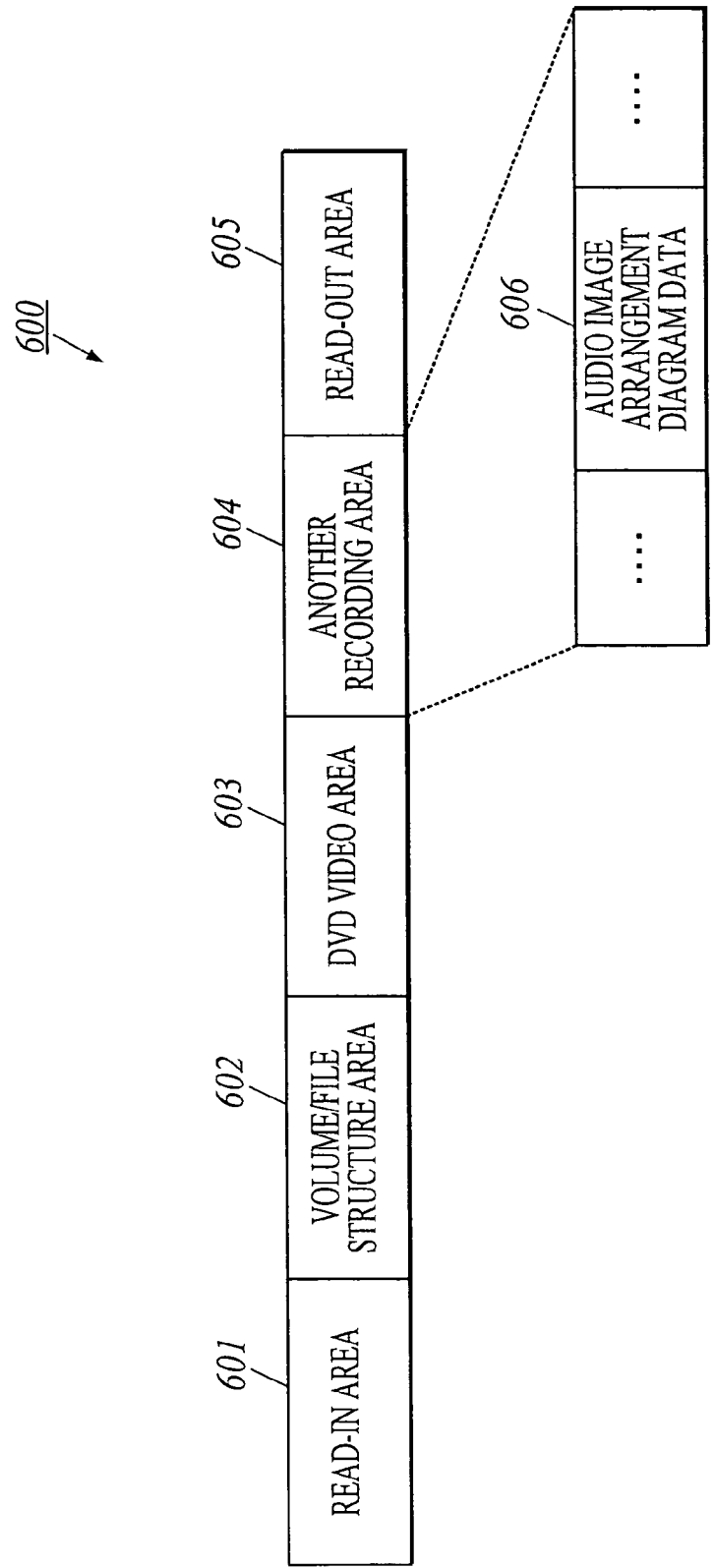
FIG. 17 is a diagram illustrating an example of a data structure of a storage medium according to a fourth embodiment of the invention.

FIG. 17 shows a data structure of the DVD 600 according to the fourth embodiment of the invention. The data structure of the DVD 600 according to the fourth embodiment of the invention is a layered structure, as shown in FIG. 17. For example, the data structure of the DVD 600 is determined based on ISO9660 as one kind of standards, and a universal disk format (UDF) bridge. In addition, the data that is stored in the DVD 600 is composed of a plurality of areas that include a read-in area 601, a volume/file structure area 602, a DVD video area 603, another recording area 604, and a read-out area 605.

In addition, the DVD 600 stores the video data and the audio data in the DVD video area 503. Further, the DVD 600 converts the analyzed result obtained by analyzing the audio data according to the predetermined analysis condition into the image data, and stores the audio image arrangement diagram data 606 in which the image data is arranged so as to correspond to the relative time axis based on the current time point in another recording area 604 as metadata. Specifically, the DVD 600 stores the audio image arrangement diagram data 606 of the audio image arrangement diagram A1 shown in FIGS. 4B and 4C in another recording area 604 as the metadata.

According to the DVD 600 according to the fourth embodiment having the above-described structure, since the audio image arrangement data 606 is stored in the DVD 600 as the metadata, even though the analyzing unit, the imaging unit, and the generating unit are not provided in the reproducing apparatus (for example, the audio data reproducing apparatus 100 or the like), the audio image arrangement diagram A1 can be displayed on the display device 300 by reproducing the audio image arrangement diagram data 606 stored in the corresponding DVD 600.

Further, in this embodiment, the audio image arrangement diagram A1 has been displayed to overlap the video A2 based on the video data, but the screen of the display device 300 may be divided into a portion displayed by the audio image arrangement diagram A1 and a portion displayed by the video A2.

Furthermore, in this embodiment, the audio image arrangement diagram A1 has included the audio image B of the time zone from the past including the current time point to the future time point, but may include the audio image B of the time zone from the current time point to the past, or may include the audio image B of the time zone from the current time point to the future time point.

Further, the first to fourth modifications may be applied to the audio data reproducing apparatus 100 that reproduces only the audio data.

Further, the audio output device 200 and the display device 300 may be integrated with the audio data reproducing apparatus 100 and the audio and video data reproducing apparatuses 400 and 500 as the audio output unit and the display unit.

Further, the index S has been exemplified as one indicating the current time point in the audio image arrangement diagram A1, but there is no restriction when display is recognized at the current time point. For example, the reproducing time may be displayed on the audio image arrangement diagram A1.

The entire disclosure of Japanese Patent Application No. 2005-282220 filed on Sep. 28, 2005, including description, claims, drawings and summary are incorporated herein by reference.

What is claimed is:

1. A reproducing apparatus which reproduces a sound based on accumulated audio data or audio data sequentially input from outside and outputs the sound from an audio output unit, comprising:
   an audio data storage unit to store audio data;
   an analyzing unit to analyze the audio data stored in the audio data storage unit in accordance with a predetermined analysis condition;
   an imaging unit to convert an analysis result obtained by the analyzing unit into previously set image data corresponding to the analysis result;
   a generating unit to generate an audio image arrangement diagram in which an audio image based on the image data imaged by the imaging unit is arranged to correspond to a relative time axis originating on a current time point;
   a video data storage unit to store video data in relation to the audio data;
   a synthesizing unit to synthesize the audio image arrangement diagram generated by the generating unit and a video reproduced at the current time point based on the video data stored in the video data storage unit, so as to generate a synthesized image; and
   a display control unit to display the synthesized image generated by the synthesizing unit on a display unit while a sound based on the audio data is reproduced and output from the audio output unit, wherein:
   in the audio image arrangement diagram, an audio image corresponding to a sound output from the audio output unit at the current time point can be recognized, and the audio image arrangement diagram includes an audio image of any one of three time zones which are a first time zone ranging from the current time point to a past including the current time point, a second time zone ranging from the current time point to a future including the current time point, and a third time zone ranging from a past to a future including the current time point;
   a duration of the first time zone is equal to a duration of the second time zone; and
   the audio image arrangement diagram shows at least one of intensity, tone color or fundamental frequency of the audio data.

2. The reproducing apparatus according to claim 1, wherein the generating unit synthesizes an index indicating the current time point to the audio image arrangement diagram.

3. The reproducing apparatus according to claim 1, wherein the generating unit changes a scale of the time axis of the audio image arrangement diagram according to a reproduction speed of the audio data.

4. The reproducing apparatus according to claim 1,
   wherein the generating unit generates at least two audio image arrangement diagrams whose time axes are different in scale from each other, and
   the display control unit simultaneously displays on the display unit the at least two audio image arrangement diagrams which are generated by the generating unit and whose time axes are different in scale from each other.

5. The reproducing apparatus according to claim 1,
   wherein the generating unit generates the audio image arrangement diagram in which a lateral axis is the time axis and a scale of the time axis varies in a longitudinal axis direction, and
   the display control unit displays on the display unit the audio image arrangement diagram which is generated by the generating unit and in which the scale of the time axis varies in the longitudinal axis direction.

6. The reproducing apparatus according to claim 1, further comprising:
   an operation unit to output an operation signal in accordance with operation of a user,
   wherein the generating unit synthesizes a marker indicating a reproducing start time point to the audio image arrangement diagram, and
   the reproducing apparatus further comprises a reproducing control unit to start reproducing audio data from a reproducing start time point shown by the marker based on an operation signal selecting the marker output from the operation unit.

7. The reproducing apparatus according to claim 1, further comprising;
   a representative video data extracting unit to extract representative video data at a predetermined time point from the video data storage unit,
   wherein the synthesizing unit synthesizes the audio image arrangement diagram generated by the generating unit, a video based on the video data stored in the video data storage unit, and an image based on the representative video data extracted by the representative video data extracting unit so as to correspond to the relative time axis originating on the current time point.

8. A method of reproducing audio data in the reproducing apparatus according to claim 1, the method comprising the steps of:
   analyzing audio data stored in the audio data storage unit in accordance with a predetermined analysis condition;
   imaging an analysis result obtained by the analyzing by converting the analysis result into previously set image data corresponding to the analysis result;
   generating an audio image arrangement diagram in which an audio image based on the image data obtained by the imaging is arranged so as to correspond to a relative time axis based on the current time point; and
   synthesizing the audio image arrangement diagram generated by the generating unit and a video reproduced at the current time point based on the video data stored in the video data storage unit, so as to generate a synthesized image; and
   displaying the synthesized image generated by the synthesizing unit on a display unit while a sound based on the audio data is reproduced and output from the audio output unit, wherein:
   in the audio image arrangement diagram, an audio image corresponding to a sound output from the audio output unit at the current time point is recognizable, and the audio image arrangement diagram includes an audio image of any one of three time zones which are a first time zone ranging from the current time point to a past including the current time point, a second time zone ranging from the current time point to a future including the current time point, and a third time zone ranging from a past to a future including the current time point;
   a duration of the first time zone is equal to a duration of the second time zone; and the audio image arrangement diagram shows at least one of intensity, tone color or fundamental frequency of the audio data.

* * * * *